United States Patent
Wang et al.

(10) Patent No.: US 10,820,050 B2
(45) Date of Patent: Oct. 27, 2020

(54) VIDEO PLAYBACK APPARATUS AND VIDEO PLAYBACK METHOD

(71) Applicant: BOE Technology Group Co., Ltd., Beijing (CN)

(72) Inventors: Shu Wang, Beijing (CN); Hui Rao, Beijing (CN); Zhiguo Zhang, Beijing (CN); Kejun Hu, Beijing (CN); Xianzhen Li, Beijing (CN); Xiaohong Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/534,229

(22) Filed: Aug. 7, 2019

(65) Prior Publication Data

US 2020/0128296 A1 Apr. 23, 2020

(30) Foreign Application Priority Data

Oct. 22, 2018 (CN) .......................... 2018 1 1230423

(51) Int. Cl.
*H04N 21/442* (2011.01)
*G06F 3/14* (2006.01)
(Continued)

(52) U.S. Cl.
CPC ..... *H04N 21/44218* (2013.01); *G06F 3/1423* (2013.01); *G06K 9/00335* (2013.01);
(Continued)

(58) Field of Classification Search
None
See application file for complete search history.

(56) References Cited

U.S. PATENT DOCUMENTS

| 2008/0004950 A1* | 1/2008 | Huang | G06Q 30/0271 |
| | | | 705/14.67 |
| 2012/0228392 A1 | 9/2012 | Cameron et al. | |

(Continued)

FOREIGN PATENT DOCUMENTS

| CN | 102118607 A | 7/2011 |
| CN | 102779499 A | 11/2012 |

(Continued)

OTHER PUBLICATIONS

First Office Action, including Search Report, for Chinese Patent Application No. 201811230423.7, dated Jun. 29, 2020, 18 pages.

*Primary Examiner* — Omar S Parra
(74) *Attorney, Agent, or Firm* — Westman, Champlin & Koehler, P.A.

(57) ABSTRACT

The embodiments of the present disclosure disclose a video playback apparatus and a video playback method. The video playback apparatus includes: an image sensor, a plurality of strip-shaped displays arranged in a first direction, and a processor connected to each of the strip-shaped displays and the image sensor, respectively, wherein the strip-shaped displays are configured to display information for associated items; the image sensor is configured to acquire image information for a user who moves in the first direction and a direction opposite to the first direction and browses the associated items; and the processor is configured to dynamically control display brightness of the plurality of strip-shaped displays according to the image information for the user, wherein brightness of one of the strip-shaped displays close to the user is greater than brightness of another one of the strip-shaped displays away from the user.

16 Claims, 10 Drawing Sheets

(51) Int. Cl.
    *G06K 9/00*          (2006.01)
    *G09G 5/12*          (2006.01)
    *H04N 21/41*        (2011.01)
    *H04N 21/414*      (2011.01)
    *H04N 21/485*      (2011.01)

(52) U.S. Cl.
    CPC ........... *G09G 5/12* (2013.01); *H04N 21/4122* (2013.01); *H04N 21/41415* (2013.01); *H04N 21/4854* (2013.01); *G09G 2320/0626* (2013.01); *G09G 2354/00* (2013.01)

(56) References Cited

U.S. PATENT DOCUMENTS

2016/0065936 A1    3/2016    Jang et al.
2018/0109928 A1*  4/2018    Walden .............. G06Q 30/0252
2018/0357981 A1*  12/2018   Ng ........................... G09G 5/12

FOREIGN PATENT DOCUMENTS

CN         103281579 A    9/2013
CN         108227897 A    6/2018

\* cited by examiner

VIDEO PLAYBACK APPARATUS AND VIDEO PLAYBACK METHOD

CROSS-REFERENCE TO RELATED APPLICATION(S)

This application claims priority to the Chinese Patent Application No. CN201811230423.7, filed on Oct. 22, 2018, entitled "VIDEO PLAYBACK SYSTEM AND VIDEO PLAYBACK METHOD", which is incorporated herein by reference in its entirety.

TECHNICAL FIELD

The present application relates to, but not limited to, the field of display technology and computer technology, and more particularly, to a video playback apparatus and a video playback method.

BACKGROUND

With the development of display technology and the popularity of applications of the display technology, some supermarkets have placed strip-shaped screens on their shelves for playing back videos, thereby enhancing the user experience of shopping.

The strip-shaped screens in the supermarkets may allow customers to watch videos while shopping in the supermarkets. In practical applications, since the strip-shaped screens are placed on the shopping shelves, when the customers move in the supermarkets, they may watch videos which are continuously played back. However, in order to ensure that the customers may always watch videos with continuity, all the strip-shaped screens on the shopping shelves are required to be in a turn-on state in the related art. Thus, in a case where there are only a small number of customers in the supermarkets, all the strip-shaped screens which are turned on may result in very high energy consumption, and most of the videos played back on the strip-shaped screens are not watched by the customers, which results in a great waste of resources.

SUMMARY

Some embodiments of the present disclosure provide a video playback apparatus, comprising: an image sensor, a plurality of strip-shaped displays arranged in a first direction, and a processor connected to each of the strip-shaped displays and the image sensor, respectively, wherein the strip-shaped displays are configured to display information for associated items, the information comprising at least names and prices of the associated items; wherein the image sensor is configured to acquire image information for the plurality of strip-shaped displays, and to acquire image information for a user who is watching one or more of the strip-shaped displays; and wherein the processor is configured to dynamically control display brightness of the plurality of strip-shaped displays according to the image information for the user.

In some embodiments, there are a plurality of image sensors arranged in a second direction parallel to the first direction.

In some embodiments, each of the plurality of image sensors is arranged between its adjacent strip-shaped displays.

In some embodiments, the image information for the user comprises a moving direction of the user; wherein each of the image sensors is further configured to determine whether there is a user in a captured picture; and wherein the processor is further configured to, when one of the image sensors determines that there is no user in a captured picture, turn off the image sensor, and when one of the image sensors determines that there is a user in a captured picture, acquire the moving direction of the user, so as to sequentially turn on the image sensors arranged in the second direction when the moving direction of the user is same as the first direction.

In some embodiments, the image information for the user comprises a watching direction of the user; wherein each of the image sensors is further configured to detect the face of a user when the image information for the user is captured in real time; and wherein the processor is further configured to acquire the watching direction of the user when one of the image sensors detects the face, so as to increase brightness of the strip-shaped displays corresponding to the watching direction of the user.

In some embodiments, the plurality of strip-shaped displays comprise a first row of strip-shaped displays in the first direction and a second row of strip-shaped displays in the third direction parallel to the first direction, and the first row of strip-shaped displays comprising a plurality of first strip-shaped displays are arranged opposite to the second row of strip-shaped displays comprising a plurality of second strip-shaped displays, wherein the plurality of image sensors comprise a first row of image sensors and a second row of image sensors, the first row of image sensors comprises a plurality of first image sensors, the second row of image sensors comprises a plurality of second image sensors, each of the first image sensors is located between adjacent, first strip-shaped displays, and each of the second image sensors is located between adjacent, second strip-shaped displays; wherein the processor is further configured to turn on the first strip-shaped display close to one of the first image sensors when the face of the user is detected by the first image sensor, and turn on the second strip-shaped display close to one of the second image sensors when the face of the user is detected by the second image sensor.

In some embodiments, the processor is further configured to turn off the first strip-shaped display close to one of the first image sensors and/or turn off the first image sensor when the face of the user is not detected by the first image sensor, and turn off the second strip-shaped display close to one of the second image sensors and/or turn off the second image sensor when the face of the user is not detected by the second image sensor.

In some embodiments, the plurality of first strip-shaped displays in the first row of strip-shaped displays correspond to the plurality of second strip-shaped displays in the first row of strip-shaped displays in a one-to-one manner, two of the first strip-shaped displays are provided between the adjacent first image sensors, two of the second strip-shaped displays are provided between the adjacent second image sensors, and the first image sensors provided between the first strip-shaped displays are provided alternately with respect to the second image sensors provided between the second strip-shaped displays.

In some embodiments, the video playback apparatus further comprises: an entrance sensor disposed at an entrance in the first direction, wherein the entrance sensor is configured to detect whether there is a user entering a monitoring range of the video playback apparatus; and the processor is further configured to turn on one or more of the image sensors adjacent to the entrance sensor when the entrance sensor detects that there is a user entering the monitoring range of the video playback apparatus.

In some embodiments, the entrance sensor is an infrared sensor.

In some embodiments, an entrance image sensor is provided between the entrance sensor and the first strip-shaped display closest to the entrance sensor.

In some embodiments, the video playback apparatus further comprises: an exit sensor disposed at an exit of a watching passage, wherein the exit sensor is configured to detect whether the user leaves the monitoring range of the video playback apparatus; and the processor is further configured to determine whether there is any user according to the number of users entering the monitoring range detected by the entrance sensor, the number of users leaving the monitoring range detected by the exit sensor, and capturing results of the image sensors, and if there is no user, turn off all of the strip-shaped displays, the image sensors, and the exit sensor.

In some embodiments, an exit image sensor is provided between the exit sensor and the first strip-shaped display closest to the exit sensor.

In some embodiments, each of the image sensors is further configured to detect whether there is a user in a captured picture thereof before the image sensor is turned off, and perform a turn-off operation when it is detected that there is no user, and remain in a turn-on state when it is detected that there is a user.

Some other embodiments of the present disclosure provides a video playback method performed by a video playback apparatus comprising an image sensor, a plurality of strip-shaped displays arranged in a first direction, and a processor connected to each of the strip-shaped displays and the image sensor, respectively, the method comprising: driving the strip-shaped displays to display information for associated items which comprises at least names and prices of the associated items; driving the image sensor to acquire image information for the plurality of strip-shaped displays, and image information for a user who is watching one or more of the strip-shaped displays; and driving the processor to dynamically control display brightness of the plurality of strip-shaped displays according to the image information for the user.

In some embodiments, the image information for the user comprises a moving direction of the user, there are a plurality of image sensors arranged in a second direction parallel to the first direction, and the method further comprises: driving each of the image sensors to determine whether there is a user in a captured picture; and driving the processor to, when one of the image sensors determines that there is no user in a captured picture, turn off the image sensor, and when one of the image sensors determines that there is a user in a captured picture, acquire a moving direction of the user, so as to sequentially turn on the image sensors arranged in the first direction when the moving direction of the user is same as the first direction.

In some embodiments, the image information for the user comprises a watching direction of the user, and the method further comprises: driving each of the image sensors to detect the face of a user when the image information for the user is captured in real time; and driving the processor to acquire the watching direction of the user when one of image sensors detects the face, so as to increase brightness of the strip-shaped displays corresponding to the watching direction of the user.

In some embodiments, the plurality of strip-shaped displays comprise a first row of strip-shaped displays in the first direction and a second row of strip-shaped displays in the third direction parallel to the first direction, and the first row of strip-shaped displays comprising a plurality of first strip-shaped displays are arranged opposite to the second row of strip-shaped displays comprising a plurality of second strip-shaped displays, wherein the plurality of image sensors comprise a first row of image sensors and a second row of image sensors, the first row of image sensors comprises a plurality of first image sensors, the second row of image sensors comprises a plurality of second image sensors, each of the first image sensors is located between adjacent, first strip-shaped displays, and each of the second image sensors is located between adjacent, second strip-shaped displays; wherein the method further comprises: driving the processor to turn on the first strip-shaped display close to one of the first image sensors when the face of the user is detected by the first image sensor, and turn on the second strip-shaped display close to one of the second image sensors when the face of the user is detected by the second image sensor.

In some embodiments, the method further comprises: driving the processor to turn off the first strip-shaped display close to one of the first image sensors and/or turn off the first image sensor when the face of the user is not detected by the first image sensor, and turn off the second strip-shaped display close to one of the second image sensors and/or turn off the second image sensor when the face of the user is not detected by the second image sensor.

In some embodiments, the plurality of first strip-shaped displays in the first row of strip-shaped displays correspond to the plurality of second strip-shaped displays in the second row of strip-shaped displays in a one-to-one manner, two of the first strip-shaped displays are provided between the adjacent first image sensors, two of the second strip-shaped displays are provided between the adjacent second image sensors, and the first image sensors provided between the first strip-shaped displays are provided alternately with respect to the second image sensors provided between the second strip-shaped displays.

The embodiments of the present disclosure provide a non-transitory computer readable storage medium having instructions stored thereon which, when executed by a processor, cause the processor to perform the method described above.

BRIEF DESCRIPTION OF THE ACCOMPANYING DRAWINGS

The accompanying drawings are used to provide a further understanding of the technical solutions of the present disclosure, and constitute a part of the specification. The accompanying drawings are used to explain the technical solutions of the present disclosure together with the embodiments of the present application, and do not constitute a limitation of the technical solutions of the present disclosure.

DETAILED DESCRIPTION

In order to make the purposes, technical solutions and advantages of the present disclosure more apparent and obvious, the embodiments of the present disclosure will be described in detail below with reference to the accompanying drawings. It should be illustrated that, the embodiments in the present application and the features in the embodiments may be combined with each other randomly without a conflict.

Steps illustrated in flowcharts of the accompanying drawings may be executed in a computer system such as a group of computer executable instructions. Further, although logical orders are shown in the flowcharts, in some cases, the steps shown or described may be performed in a different order than those described here.

The present disclosure provides the following specific embodiments which may be combined with each other, and the same or similar concepts or processes may not be described in detail in some embodiments.

In order to at least partially solve or alleviate the above technical problems, some embodiments of the present disclosure provide a video playback apparatus and a video playback method, which solve the problems, in an application scenario where videos are played back by a plurality of strip-shaped screens, that a high energy consumption is required since all the strip-shaped screens are turned on at the same time and a lot of resources are wasted when the videos are watched by a small number of viewers.

Figure 1:
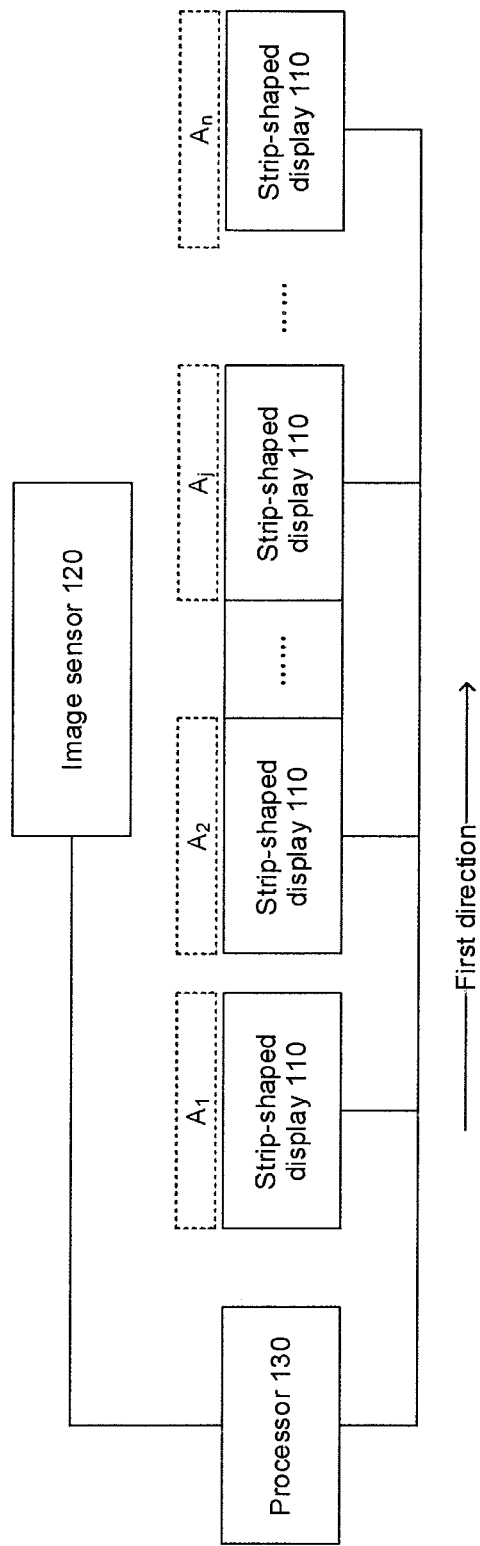
FIG. 1 is a schematic structural diagram of a video playback apparatus according to an embodiment of the present disclosure.

FIG. 1 is a schematic structural diagram of a video playback apparatus according to an embodiment of the present disclosure. The video playback apparatus according to the present embodiment comprises: an image sensor 120, a plurality of strip-shaped displays 110 arranged in a first direction, and a processor 130 connected to the respective strip-shaped displays 110 and the image sensor 120.

In the embodiment of the present disclosure, the strip-shaped displays 110 are configured to display information for associated items which comprises at least names and prices of the associated items;

the image sensor 120 is configured to acquire image information for the plurality of strip-shaped displays 110, and image information for a user who moves in the first direction and a direction opposite to the first direction and browses the associated items; and the processor 130 is configured to dynamically control display brightness of the plurality of strip-shaped displays 110 according to the image information for the user, so that brightness of one of the strip-shaped displays 110 having a first distance from the user is greater than brightness of another one of the strip-shaped displays 110 having a second distance from the user, wherein the first distance is less than the second distance.

The distance between any of the strip-shaped displays 110 and the user can be measured or determined by any appropriate techniques. For example, one or more distance or ranging sensors (such as, a Light Detection & Ranging (LiDAR) sensor or a Laser Detection & Ranging (LaDAR) sensor) collocated with one or more strip-shaped displays 110 may be used to measure the distances between the respective strip-shaped displays 110 and the user. For another example, the distance can be calculated by the processor 130 based on the image information for the user and/or the image information for the plurality of strip-shaped displays 110. To be specific, in some embodiments, the processor 130 may calculate the practical distance between the user and a specific strip-shaped display 110 based on the image distance therebetween in the captured image and a predetermined ratio. In some embodiments, the predetermined ratio may be determined as the ratio of the practical dimensions of the strip-shaped display to the image dimensions of the strip-shaped display). Further, in some embodiments, the distance may be calculated in view of the image distortion caused by the lens of the image sensor 120.

The video playback apparatus according to the embodiment of the present disclosure may be applied to a scenario where there is a passage through which a user may move and the plurality of strip-shaped displays 110 and the image sensor 120 may be disposed in the passage, for example, a shopping passage in a supermarket, a watching passage in a museum or other exhibition halls etc. The strip-shaped displays 110 may be strip-shaped display screens (comprising, but not limited to, for example, Light Emitting Diode (LED) displays, Liquid Crystal Displays (LCDs), Organic Light Emitting Diode (OLED) displays, quantum point displays, plasma displays, Cathode Ray Tube (CRT) displays, etc.), the image sensor 120 may be an image sensor (comprising, but not limited to, for example, a web camera, a camera, a video camera, an infrared sensor, a motion sensor, etc.), and the processor 130 may be a processor having a computing capability and a control capability (comprising, but not limited to, for example, a Central Processing Unit (CPU), a microprocessor, a microcontroller, a Graphics Processing Unit (GPU), an Application Specific Integrated Circuit (ASIC), a Field Programmable Gate Array (FPGA), a Programmable Logic Device (PLD), etc.) In practical applications, the plurality of strip-shaped displays 110 may be sequentially arranged in a specific direction (for example, the first direction). If the video playback apparatus is applied to a shopping passage in a supermarket, the plurality of strip-shaped displays 110 may be disposed on shopping shelves on one side or both sides of the shopping passage. In addition to the strip-shaped displays 110, various items are usually placed on the shopping shelves. The information for the associated items which is displayed by the strip-shaped displays 110 may be information for items placed on the shopping shelves where the strip-shaped displays 110 are located, or may also be information for items placed on other shopping shelves. The information for the associated items may comprise not only names and prices of the associated items, but also specific positions where the associated items are located, for example, a zone where the shopping shelves are located, a floor and a region of the shopping shelves where the associated items are located, etc. The image sensor 120 may be disposed between the strip-shaped displays 110 or may be disposed on the top of the shopping passage. In the embodiment of the present disclosure, all the strip-shaped displays 110 are located in a capturing range of the image sensor 120. A user in the supermarket browses the associated items by watching the information for the associated items displayed by the strip-shaped displays 110, and thereby the image sensor 120 may further capture image information for the user in front of the strip-shaped displays 110. The captured user may be a user who needs to purchase the associated items, and the user may move back and forth while watching, for example, the user may move in a direction (i.e., the first direction) in which the plurality of strip-shaped displays 110 are arranged, or may move in an opposite direction (i.e., a direction opposite to the first direction). If the video playback apparatus is applied to a watching passage in a museum or other exhibition halls, the plurality of strip-shaped displays 110 may be disposed on walls on one side or both sides of the watching passage, and the strip-shaped displays 110 may display information for cultural relics or content of subject matters to be exhibited by the exhibition hall; and the image sensor 120 may be disposed between the strip-shaped displays 110, or may be disposed on the top of the watching passage or at other positions, wherein the first direction may be a direction in which shopping shelves on one side of the shopping passage are arranged or a watching guidance direction on walls on one side of the watching passage.

Based on the arrangement of the image sensor 120, a type of information acquired by the image sensor 120 and a manner in which the processor 130 is disposed in the video playback apparatus according to the embodiment of the present disclosure, the processor 130 may dynamically control display brightness of the plurality of strip-shaped displays 110 according to the image information for the user acquired by the image sensor 120. For example, the processor 130 may control the display brightness of the strip-shaped displays 110 based on distances between the respective strip-shaped displays 110 and the user, for example, a strip-shaped display 110 close to the user has relatively high brightness, and a strip-shaped display 110 away from the user has relatively low brightness. In a special case, when a distance between a certain strip-shaped display 110 and the user exceeds a certain distance range, brightness of the strip-shaped display 110 is adjusted so that the strip-shaped display 110 enters a dark state, for example, a black screen state.

It should be illustrated that, in the embodiment of the present disclosure, the plurality of strip-shaped displays 110 may display information for the same associated items, that is, the plurality of strip-shaped displays 110 may be associated with the same items, or may display information for different associated items, that is, different strip-shaped displays 110 may be associated with different items.

The video playback apparatus shown in FIG. 1 is illustrated by taking the plurality of strip-shaped displays 110 being disposed in the first direction and the image sensor 120 being disposed on the top of the passage where the strip-shaped displays 110 are located as an example. As shown, the strip-shaped displays 110 in the first direction are numbered from left to right as $A_1, A_2, \ldots, A_j, \ldots, A_n$, and all the strip-shaped displays 110 are located in the capturing range of the image sensor 120. Therefore, the image sensor 120 may capture image information for all the strip-shaped displays 110 in the video playback apparatus and the image information for the user who browses the associated items displayed by the strip-shaped displays 110, and the processor 130 may control display brightness of these strip-shaped displays 110 (comprising $A_1$-$A_n$) according to the image information for the user acquired by the image sensor 120. For example, a distance between the user and the strip-shaped display 110 ($A_2$) is the smallest, for example, the user is directly in front of $A_2$. In this case, the processor 130 controls brightness of $A_2$ to be optimal brightness for watching by the user, controls brightness of $A_1$ and $A_3$ adjacent to $A_2$ to be less than that of $A_2$, and controls brightness of other strip-shaped displays 110 to be even lower, for example, brightness of $A_n$ may be adjusted so that $A_n$ enters a black screen state of the display screen.

It should be illustrated that in the embodiment shown in FIG. 1, although the structure of the video playback apparatus is shown by taking one image sensor 120 as an example, a number of image sensors 120 in the video playback apparatus is not limited in the embodiment of the present disclosure, and there may be one or more image sensors 120 in FIG. 1, as long as it may be ensured that all the strip-shaped displays 110 in the video playback apparatus are located in the capturing range of the image sensor(s) 120, and the image sensor(s) 120 may acquire the image information for the user who browses the associated items displayed by all the strip-shaped displays 110.

Figure 2:
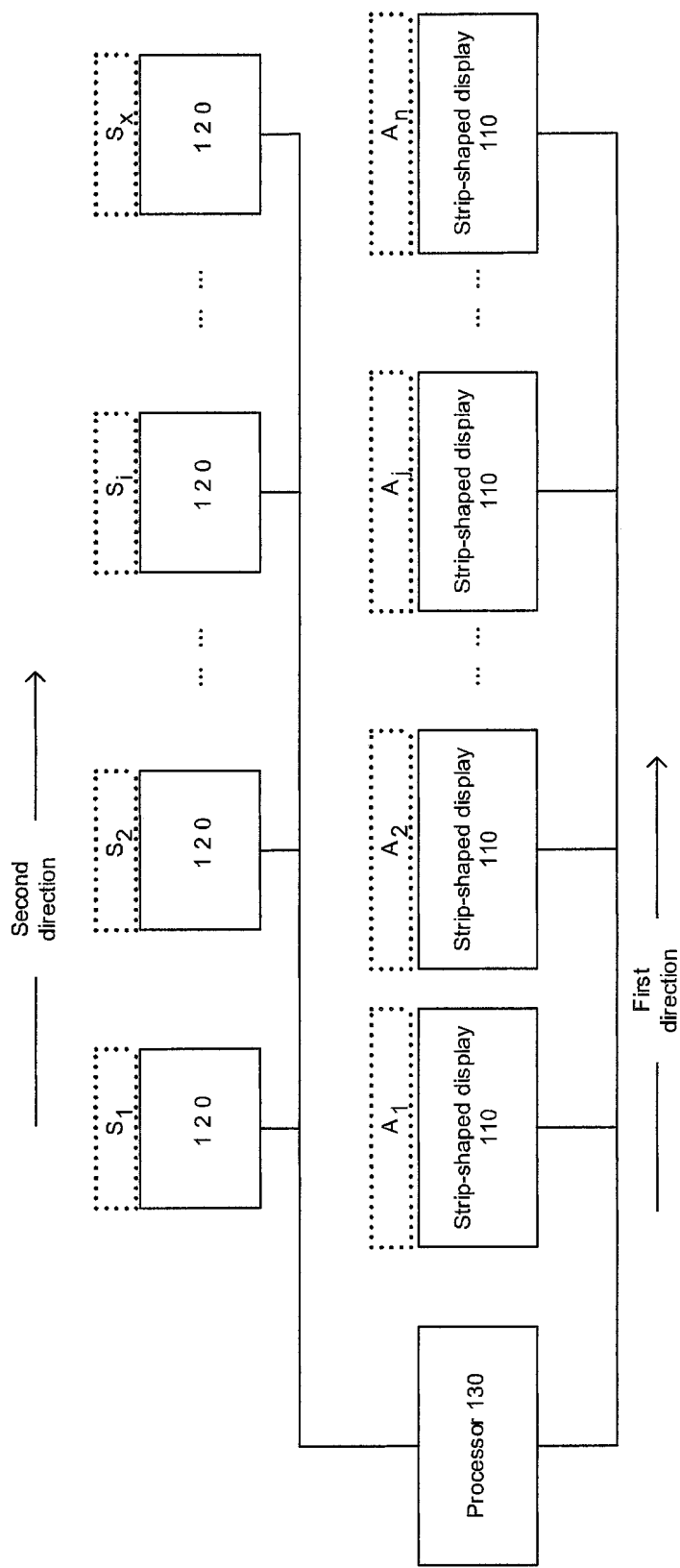
FIG. 2 is a schematic structural diagram of another video playback apparatus according to an embodiment of the present disclosure.

Another possible implementation of the embodiment of the present disclosure will be described below by taking a plurality of image sensors 120 as an example. As shown in FIG. 2, illustrated is a schematic structural diagram of another video playback apparatus according to an embodiment of the present disclosure. The video playback apparatus shown in FIG. 2 comprises a plurality of image sensors 120. The video playback apparatus comprises a plurality of strip-shaped displays 110 arranged in a first direction. The plurality of image sensors 120 are arranged in a second direction parallel to the first direction (or the plurality of image sensors 120 are arranged in the first direction). FIG. 2 is illustrated by taking the plurality of image sensors 120 being arranged in the second direction (for example, the plurality of image sensors 120 are disposed on the top of a passage where the strip-shaped displays 110 are located at intervals) as an example. As shown in FIG. 2, the strip-shaped displays 110 in the first direction are numbered from left to right as $A_1, A_2, \ldots, A_j, \ldots, A_n$, and the image sensors 120 in the second direction are numbered from left to right as $S_1, S_2, \ldots, S_i, \ldots, S_x$. An application scenario of the video playback apparatus shown in FIG. 2 is a watching passage for watching on a single side, for example, there are strip-shaped displays 110 disposed on shopping shelves on only one side of a shopping passage in a supermarket or on only one side of a watching passage in an exhibition hall. Each of the image sensors 120 in the video playback apparatus may capture primarily image information for strip-shaped displays 110 in a capturing range of the current image sensor 120 and image information for a user, and may obtain a moving direction and a watching direction of the user through the captured image information for the user. Further, a processor 130 connected to each of the image sensors 120 and each of the strip-shaped display may acquire the moving direction and the watching direction of the user which is captured by each of the image sensors 120, and after obtaining the information, may determine distances between the respective strip-shaped displays 110 in the apparatus and the user, so as to dynamically adjust display brightness of the plurality of strip-shaped displays 110 in the apparatus according to the distances. In another implementation of the embodiment of the present disclosure, if the strip-shaped displays 110 are disposed on the shopping shelves on both sides of the shopping passage in the supermarket, the processor 130 may further determine a specific side on which the user is currently watching strip-shaped displays 110 through the watching direction of the user. For example, if the user moves from a position of $A_1$ to a position of $A_2$ in FIG. 2, and the watching direction of the user is a direction facing $A_2$, the processor 130 may increase brightness of $A_2$ and reduce brightness of $A_1$, and dynamically adjust brightness of other strip-shaped displays 110 in the video playback apparatus as the moving direction and the watching direction of the user.

It should be illustrated that, specific positions where the plurality of image sensors 120 in the video playback apparatus are disposed are not limited in the embodiment of the present disclosure. The plurality of image sensors 120 may be disposed on the top of a passage where the strip-shaped displays 110 are located (i.e., in the second direction), as shown in FIG. 2. These image sensors 120 may also be disposed in the first direction, for example, between the strip-shaped displays 110 intermittently. Further, a specific number of strip-shaped displays 110 disposed between two adjacent image sensors 120 is not limited, and may be flexibly adjusted according to a capturing range of each of the image sensors 120. These image sensors 120 may also be disposed at other positions parallel to the first direction, for example, on a side opposite to the shopping shelves where the strip-shaped displays 110 are located, and may also capture the user moving in the first direction and in the opposite direction. In addition, capturing ranges of adjacent image sensors 120 may abut each other, or may overlap with each other to some extent. The video playback apparatus shown in FIG. 2 is illustrated by taking an example in which a capturing range of each image sensor 120 at least comprises an area covering a length of one strip-shaped display 110 and capturing ranges of adjacent image sensors 120 overlap with each other at edge positions in a certain area. The image sensors 120 are disposed in such a way to eliminate a capturing dead angle and ensure the effectiveness of the capturing process.

In the video playback apparatus according to the embodiment of the present disclosure, the strip-shaped displays 110 may be disposed in a similar manner to that of strip-shaped screens in a common application scenario, that is, they may be contiguously disposed in a passage through which a user moves, for example, a shopping passage in a supermarket or a watching passage in an exhibition hall, to provide hardware facilities capable of playing back videos with continuity. However, in the related art, in order to ensure that the user may watch videos having a continuous playback effect while moving, all the strip-shaped screens need to be in a turn-on state at the same time. Thus, in a case where there are only a small number (for example, one to two) of users, all the strip-shaped screens which are turned on may result in a very high energy consumption, and most of the videos played back by the strip-shaped screens are not watched by users, which results in a great waste of resources. For the above-mentioned problems in the related art, in the video playback apparatus according to the embodiment of the present disclosure, the image sensors 120 are configured to acquire image information for the user to acquire, for example, a moving direction and a watching direction of the user, and the processor 130 may be configured to determine relative distances between the plurality of strip-shaped displays 110 in the apparatus and the user according to the image information for the user acquired by the image sensors 120, so as to dynamically control display brightness of the plurality of strip-shaped displays 110 in the apparatus. In this way, brightness of a strip-shaped display 110 close to the user may be adjusted to be suitable for watching, and brightness of a strip-shaped display 110 away from the user may be adjusted to lower brightness or may be adjusted so that the strip-shaped display 110 may enter a black screen state, so as to achieve the effect of reducing the energy consumption.

The video playback apparatus according to the embodiment of the present disclosure comprises the image sensors 120 and the plurality of strip-shaped displays 110 arranged in the first direction. Here, the strip-shaped displays 110 may display information for associated items, and the image sensors 120 may acquire image information for the plurality of strip-shaped displays 110 and image information for a user who moves in the first direction and a direction opposite to the first direction and browses the associated items. The processor 130 which is connected to the respective strip-shaped displays 110 and the image sensors 120 is disposed in the video playback apparatus, to dynamically control display brightness of the plurality of strip-shaped displays 110 according to the image information for the user acquired by the image sensors 120, so that, for example, brightness of a strip-shaped display close to the user is greater than that of a strip-shaped display away from the user. The image sensors 120 and the processor 130 are configured so that the video playback apparatus according to the embodiment of the present disclosure may acquire the information related to the user in the application scenario thereof in real time, so as to dynamically control the display brightness of the strip-shaped displays 110 in the video playback apparatus, to achieve the purpose of reducing the energy consumption. Further, when the brightness of the strip-shaped displays 110 in the video playback apparatus according to the embodiment of the present disclosure are dynamically controlled by the video playback apparatus, an effect that strip-shaped displays 110 with high brightness are being watched by users as much as possible and strip-shaped displays 110 with low brightness or in a black screen state are not watched by users may be realized, so as to avoid the problem of a waste of resources.

It should be illustrated that, in the video playback apparatus according to the embodiments of the present disclosure described above, users captured by different image sensors may not be the same user, that is, there may be more than one user in the application scenario. If there are a small number of users in the application scenario, it means that the application scenario is related to a large area, and the users are scattered at different positions in the scenario, that is, the small number of users may be located at different positions in the application scenario. At this time, the processor 130 may dynamically control the brightness of the plurality of strip-shaped displays 110 in the apparatus synthetically according to image information for the users captured by the plurality of image sensors 120. At this time, brightness of a small number of strip-shaped displays 110 close to the users is greater than that of other strip-shaped displays 110 away from the users.

Figure 3:
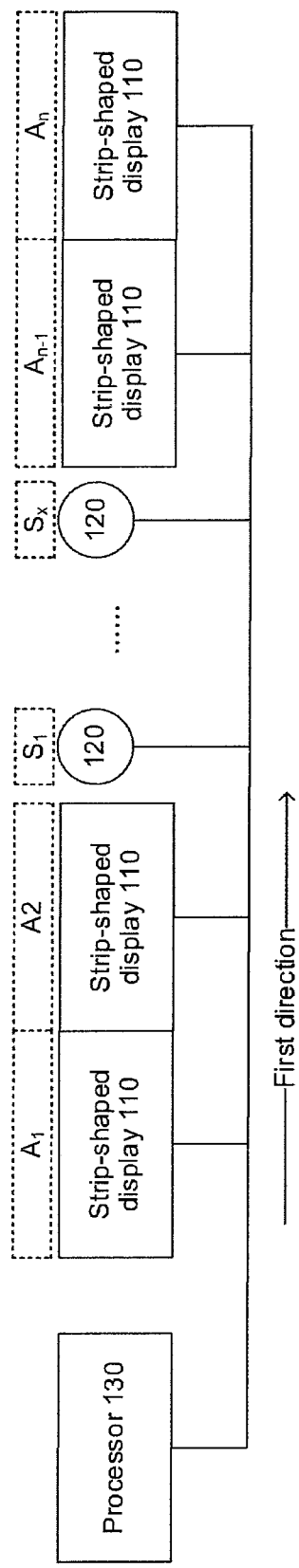
FIG. 3 is a schematic structural diagram of yet another video playback apparatus according to an embodiment of the present disclosure.

In some embodiments, at least two of the plurality of strip-shaped displays 110 are arranged contiguously, and the at least two strip-shaped displays 110 which are arranged contiguously are spliced to display one image. However, the present disclosure is not limited thereto. In some other embodiments, the at least two strip-shaped displays 110 may be arranged separately or at certain intervals. The plurality of strip-shaped displays 110 shown in FIG. 1 and FIG. 2 are, for example, not contiguously arranged. As shown in FIG. 3, illustrated is a schematic structural diagram of yet another video playback apparatus according to an embodiment of the present disclosure. There are strip-shaped displays 110 which are contiguously arranged in FIG. 3, and FIG. 3 is illustrated by taking each two strip-shaped display 110 being contiguously arranged as an example. The image sensors 120 are disposed between some strip-shaped displays 110 intermittently (i.e., the plurality of image sensors 120 are arranged in a first direction in FIG. 3) to form strip-shaped displays 110 which are not contiguously arranged. The strip-shaped displays 110 which are contiguously arranged in FIG. 3 may be spliced to display one image. For example, when there is too much information for some associated items which may not be fully displayed on one strip-shaped display 110, the strip-shaped displays 110 which are contiguously arranged may be spliced to display the information, which has a better effect as compared with a case where the information is displayed on one strip-shaped display 110 in a time-division manner, thereby achieving better user experience.

It should be illustrated that, in the embodiment of the present disclosure, a number of the strip-shaped displays 110 which are contiguously arranged is not limited to two as illustrated in FIG. 3, and may be more than two in practical applications. The number of the strip-shaped displays 110 which are contiguously arranged may be adjusted according to a size of an image to be displayed by splicing the strip-shaped displays 110 while the strip-shaped display 110 which are contiguously arranged are located in capturing ranges of the respective image sensors 120, so that the processor 130 may dynamically control the display brightness of all the strip-shaped displays 110.

In some embodiments, the image information for the user acquired by the image sensors 120 may comprise a moving direction of the user. It may be seen from an operating manner of the video playback apparatus according to the embodiments of the present disclosure described above that, the image sensor 120 according to the embodiment of the present disclosure may have a turn-on state and a turn-off state. Generally, an image sensor 120 with a user in a capturing range thereof is in a turn-on state, and an image sensor 120 without a user in a capturing range thereof is in a turn-off state.

In the embodiment of the present disclosure, each of the image sensors 120, when in the turn-on state, is further configured to determine whether there is a user in a captured picture in real time; and the processor 130 is further configured to, when one of the image sensors 120 determines that there is no user in a captured picture, turn off the image sensor 120, and when one of the image sensors 120 determines that there is a user in a captured picture, acquire a moving direction of the user, so as to turn on or turn off other image sensors 120 adjacent to the image sensor 120.

In the embodiment of the present disclosure, the processor 130 in the video playback apparatus may not only dynamically control the display brightness of the strip-shaped displays 110, but also may control turn-on and turn-off of the image sensors 120. Further, the turn-on and turn-off of the image sensors 120 are related to the moving direction of the user, for example, after the user moves, if an image sensor 120 is gradually close to the user, the image sensor 120 is to be turned on, and after the user moves, if an image sensor 120 is gradually away from the user, the image sensor 120 is to be turned off. In the embodiment of the present disclosure, the turn-on and turn-off of the image sensors 120 are controlled by the processor 130, which may further reduce the energy consumption of the video playback apparatus, and when there is a small number of users in an application scenario thereof, the image sensors 120 are selected to turn on image sensors 120 each with a user in a capturing range thereof, so that the image sensors 120 which are turned on may achieve an effective capturing process, which not only enhances the effective use rate of each hardware device in the video playback apparatus, but also further reduces a waste of resources in the apparatus.

It should be illustrated that the image sensors 120 in the turn-on state described in the embodiment of the present disclosure do not exclude an image sensor $S_{i-1}$ which has not been turned off when a user just moves from a capturing range of the image sensor $S_{i-1}$ to a capturing range of another image sensor $S_i$. It takes some processing time for the processor 130 to turn off a certain image sensor 120 according to a captured picture of the image sensor 120 and a determination result.

In some embodiments, the image information for the user acquired by the image sensors 120 may further comprise a watching direction of the user, and an image sensor 120 which performs a capturing process is generally an image sensor with a user in a captured picture.

In the embodiment of the present disclosure, the processor 130 may dynamically control the display brightness of the plurality of strip-shaped displays 110 by:

increasing brightness of a strip-shaped display 110 which is adjacent to an image sensor 120 with a user in a captured picture thereof and is currently being watched by the user according to a position of the image sensor 120 and a watching direction of the user acquired by the image sensor 120.

In the embodiment of the present disclosure, when the processor 130 dynamically controls the display brightness of the strip-shaped displays 110, it may perform reasonable controlling not only according to a position and the moving direction of the user in the application scenario, but also in combination with the watching direction of the user. For example, the user moves in the first direction and a direction opposite to the first direction, but the watching direction of the user is not toward the strip-shaped displays 110 on the shopping shelves in the first direction, and instead, is another direction, for example, a direction toward shopping shelves opposite to the shopping shelves in the first direction, that is, the strip-shaped displays 110 which are passed by the user at this time are not watched by the user even if they are turned on. Therefore, when it is determined that the user is in a capturing range of an image sensor 120 which is currently performing a capturing process and is watching a certain strip-shaped display 110 adjacent to the image sensor 120 according to the watching direction of the user, brightness of the strip-shaped display 110 which is currently in an effective watching state is increased, thereby further improving the effective use rate of each hardware device in the video playback apparatus, and further reducing the waste of resources in the apparatus.

Figure 4:
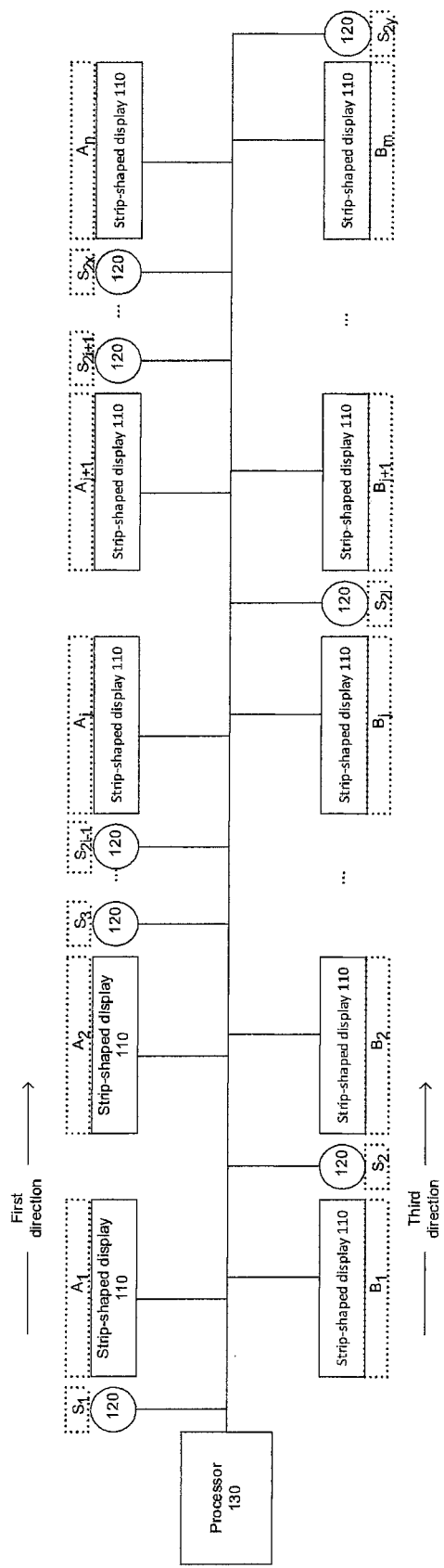
FIG. 4 is a schematic structural diagram of still another video playback apparatus according to an embodiment of the present disclosure.

FIG. 4 is a schematic structural diagram of still another video playback apparatus according to an embodiment of the present disclosure. In the embodiment of the present disclosure, image information for a user acquired by image sensors 120 may also comprise a watching direction of the user. On the basis of the structure of the apparatus shown in FIG. 1, the video playback apparatus according to the embodiment of the present disclosure further comprises: a plurality of strip-shaped displays 110 arranged in a third direction parallel to the first direction, and the image sensors 120 are disposed between the strip-shaped displays 110 in the first direction and between the strip-shaped displays 110 in the third direction intermittently. In other words, the plurality of strip-shaped displays 110 may comprise a first row of strip-shaped displays 110 in the first direction and a second row of strip-shaped displays 110 in the third direction parallel to the first direction as shown in FIG. 4. The first row of strip-shaped displays 110 comprising a plurality of first strip-shaped displays 110 may be arranged opposite to the second row of strip-shaped displays 110 comprising a plurality of second strip-shaped displays 110. Further, the plurality of image sensors 120 may comprise a first row of image sensors 120 and a second row of image sensors 120. The first row of image sensors 120 may comprise a plurality of first image sensors 120, and the second row of image sensors 120 may comprise a plurality of second image sensors 120. In such a case, each of the first image sensors 120 may be located between adjacent, first strip-shaped displays 110, and each of the second image sensors 120 may be located between adjacent, second strip-shaped displays 110, as shown in FIG. 4. In the embodiment of the present disclosure, each of the image sensors 120, when in a turn-on state, is further configured to detect the face of a user when the user is captured in real time; and the processor 130 is further configured to acquire a watching direction of the user when one of image sensors 120 in the first direction detects the face or one of image sensors 120 in the third direction captures the user but does not detect the face, so as to increase brightness of the strip-shaped displays 110 in the first direction; or is further configured to acquire the watching direction of the user when one of the image sensors 120 in the third direction detects the face or one of the image sensors 120 in the first direction captures the user but does not detect the face, so as to increase brightness of the strip-shaped displays 110 in the third direction. In other words, the processor 130 may be further configured to turn on the first strip-shaped display 110 close to one of the first image sensors 120 when the face of the user is detected by the first image sensor 120, and turn on the second strip-shaped display 110 close to one of the second image sensors 120 when the face of the user is detected by the second image sensor 120. Furthre, in some other embodiments, the processor 130 may be further configured to turn off the first strip-shaped display 110 close to one of the first image sensors 120 and/or turn off the first image sensor 120 when the face of the user is not detected by the first image sensor 120, and turn off the second strip-shaped display 110 close to one of the second image sensors 120 and/or turn off the second image sensor 120 when the face of the user is not detected by the second image sensor 120.

In the embodiment of the present disclosure, in an application scenario of the video playback apparatus, the watching passage is no longer a video passage which may only be used for watching on a single side, and there are strip-shaped displays 110 disposed on both sides of the watching passage (i.e., on planes where the first direction and the third direction are located). The planes where the first direction and the third direction are located may be walls on both sides of the watching passage or shopping shelves on both sides of a shopping passage in a supermarket. In addition, the video playback apparatus according to the embodiment of the present disclosure is illustrated by taking the image sensors 120 being disposed on the planes where the first direction and the third direction are located as an example. Since there are strip-shaped displays arranged in the first direction and the third direction, the image sensors 120 may be disposed between the strip-shaped displays 110 intermittently. FIG. 4 is illustrated by taking two strip-shaped displays 110 being disposed between two adjacent image sensors 120 as an example. Since the image sensors 120 and the strip-shaped displays 110 are disposed on the same plane in the embodiment of the present disclosure, the face of the user generally faces a strip-shaped display which is in a visual range of the user and is convenient for watching during the movement of the user. For one user, since the planes where the first direction and the third direction are located are on opposite sides and the user may only watch strip-shaped displays 110 on only one side at a time, the processor 130 may acquire a watching direction of the user according to whether one of the image sensors 120 detects the face of the user, and dynamically control brightness of the strip-shaped displays 110 in the first direction or the third direction according to the watching direction.

It should be illustrated that a specific density at which the image sensors 120 are disposed is not limited in the embodiment of the present disclosure, that is, a number of strip-shaped displays 110 disposed between two adjacent image sensors 120 is not limited, and may be reasonably set according to capturing ranges of the two adjacent image sensors 120.

In some embodiments, a captured picture of each of the image sensors 120 comprises a left side picture and a right side picture, the image sensors 120 in the first direction are numbered with odd numbers sequentially from left to right, the image sensors 120 in the third direction are numbered with even numbers sequentially from left to right, an image sensor $S_{2i}$ is located adjacent to the left side of an image sensor $S_{2i+1}$, and the image sensor $S_{2i}$ is located adjacent to the right side of an image sensor $S_{2i-1}$, where i is a positive integer greater than or equal to 1. As shown in FIG. 4, the strip-shaped displays 110 in the first direction are numbered sequentially from left to right as $A_1$, $A_2$, ..., $A_j$, $A_{j+1}$, ..., $A_n$, the strip-shaped displays 110 in the third direction are numbered sequentially from left to right as $B_1$, $B_2$, ..., $B_j$, $B_{j+1}$, ..., $B_m$, two strip-shaped displays 110 are disposed between two adjacent image sensors 120, image sensors 120 in the first direction are numbered with odd numbers sequentially from left to right as $S_1$, $S_3$, ..., $S_{2i-1}$, $S_{2i+1}$, ..., $S_{2x}$, and image sensors 120 in the third direction are numbered with even numbers sequentially from left to right as $S_2$, $S_4$ (not shown), ..., $S_{2i}$, ..., $S_{2y}$, where n and m may be equal or unequal, and x and y may be equal or unequal, which are set according to a specific application scenario. In the video playback apparatus shown in FIG. 4, each image sensor 120 may be configured to at least capture an area on an opposite side which covers a length greater than a length of two strip-shaped displays. The image sensors 120 are disposed in such a way to eliminate a dead angle and ensure the effectiveness of the capturing process.

In some embodiments, the plurality of first strip-shaped displays 110 in the first row of strip-shaped displays 110 may correspond to the plurality of second strip-shaped displays 110 in the second row of strip-shaped displays 110 in a one-to-one manner. In some embodiments, two of the first strip-shaped displays 110 may be provided between the adjacent first image sensors 120, and/or two of the second strip-shaped displays 110 are provided between the adjacent second image sensors 120. Further, in some embodiments, the first image sensors 120 provided between the first strip-shaped displays 110 are provided alternately with respect to the second image sensors provided between the second strip-shaped displays. The term "alternately" used here refers to an arrangement in which each of the first image sensors 120 is not aligned with any of the second image sensors 120 in a direction perpendicular to the first direction or the third direction, and vice versa, as shown in FIG. 4.

In the embodiment of the present disclosure, each of the image sensors 120, when in a turn-on state, is further configured to determine whether there is a user moving from one side picture to the other side picture in a captured picture;

the processor 130 is further configured to, when a determination result of one of the image sensors 120 is yes, determine whether the image sensor 120 is located in the first direction or the third direction;

turn on an image sensor $S_{(2i+1)+1}$ on the right side of a current image sensor $S_{2i+1}$ and turn off an image sensor $S_{(2i+1)-1}$ on the left side of the current image sensor $S_{2i+1}$ when the image sensor is located in the first direction and the user moves from the left side picture to the right side picture;

turn on the image sensor $S_{(2i+1)-1}$ on the left side of the current image sensor $S_{2i+1}$ and turn off the image sensor $S_{(2i+1)+1}$ on the right side of the current image sensor $S_{2i+1}$ when the image sensor is located in the first direction and the user moves from the right side picture to the left side picture;

turn on the image sensor $S_{2i+1}$ on the right side of a current image sensor $S_{2i}$ and turn off an image sensor $S_{2i-1}$ on the left side of the current image sensor $S_{2i}$ when the image sensor is located in the third direction and the user moves from the left side picture to the right side picture; and turn on the image sensor $S_{2i-1}$ on the left side of the current image sensor $S_{2i}$ and turn off the image sensor $S_{2i+1}$ on the right side of the current image sensor $S_{2i}$ when the image sensor is located in the third direction and the user moves from the right side picture to the left side picture.

In addition, in the embodiment of the present disclosure, the processor 130 is further configured to adjust display brightness of the strip-shaped displays 110 in the video playback apparatus in a case where a determination result of one of the image sensors 120 is no and/or after one of the image sensors 120 is turned on each time.

In the embodiment of the present disclosure, in order to better determine the moving direction of the user, the captured picture of each of the image sensors 120 may be divided into two parts, i.e., a left side picture and a right side picture, and in a case where there is only one user in a captured picture of a certain image sensor 120, a moving direction of the user in a watching passage may be determined according to a moving direction of the user in the captured picture, and turn-on and turn-off of the image sensors 120 in the apparatus are controlled according to the moving direction of the user, i.e., dynamically turning on the image sensor 120 which may capture the user, and turning off the image sensor 120 when the user leaves a capturing range of the image sensor 120 which is originally turned on since the user moves. In addition, if the image sensor 120 captures the user and the user does not move in the captured picture, it may be determined that the user in the captured picture is watching a certain strip-shaped video at a fixed point. At this time, the processor 130 may control to increase brightness of the strip-shaped display 110 which is currently being watched by the user, and reduce brightness of strip-shaped displays 110 in an inactive watching state. Further, each time the processor 130 turns on an image sensor 120, it means that the user in the watching passage has moved. At this time, the display brightness of the strip-shaped displays 110 in the video playback apparatus may be adjusted again according to a captured picture of the image sensor 120 which is newly turned on.

In some embodiments, in a process of the processor 130 adjusting the display brightness of the strip-shaped displays 110 in the video playback apparatus, the processor 130 may make the adjustment based on the watching direction of the user captured by the image sensors 120. The watching direction of the user may further be determined as follows.

Each of the image sensors 120, when in a turn-on state, is further configured to determine whether the face of the user is on a left side picture or a right side picture of a captured picture after the face is detected; and the processor 130 is further configured to adjust display brightness of the strip-shaped displays in the video playback apparatus by:

when one of the image sensors 120 determines that the face is on the left side picture of the captured picture, increasing brightness of a strip-shaped display on the left side of the image sensor 120 and reducing brightness of a strip-shaped display on the right side of the image sensor 120; and when one of the image sensors 120 determines that the face is on the right side of the captured picture, increasing the brightness of the strip-shaped display on the right side of the image sensor 120 and reducing the brightness of the strip-shaped display on the left side of the image sensor 120.

In the embodiment of the present disclosure, based on a manner in which the image sensors 120 and the strip-shaped displays 110 are disposed on the same plane, in a case where one of the image sensors 120 has detected the face of the user, it may further be determined which side of the image sensor 120 a strip-shaped display 110 watched by the user is located on, and brightness of the strip-shaped display 110 which is currently being watched by the user may be adjusted accurately.

It should be illustrated that in the embodiment of the present disclosure, whether the image sensor 120, which captures the face of the user and determines which side of the captured picture the face is located, is located in the first direction or the third direction is not limited. Regardless of the direction where the image sensor 120 is located, the processor 130 adjusts brightness of a strip-shaped display 110 at a position corresponding to the image sensor 120 according to a position of the face in the captured picture in the same manner with reference to the same direction. For example, when an image sensor $S_{2i+1}$ in the first direction captures a face and the face is located on a left side picture of a captured picture, brightness of a strip-shaped display on the left side of the image sensor $S_{2i+1}$ is increased, and brightness of a strip-shaped display on the right side of the image sensor $S_{2i+1}$ is reduced. As another example, when an image sensor $S_{2i}$ in the third direction captures a face and the face is located on a right side picture of a captured picture, brightness of a strip-shaped display on the right side of the image sensor $S_{2i}$ is increased, and brightness of a strip-shaped display on the left side of the image sensor $S_{2i}$ is reduced.

Further, please note that although the brightness of a strip-shaped display 110 is adjusted based on the distance between the strip-shaped display 110 and the user and also based on the watching direction of the user in the above embodiment, the present disclosure is not limited thereto. For example, in some other embodiments, the brightness of a strip-shaped display may be adjusted based on the distance between the strip-shaped display 110 and the user only, or based on the watching direction of the user only, or based on any other condition, either solely or in any combination thereof.

Figure 5:
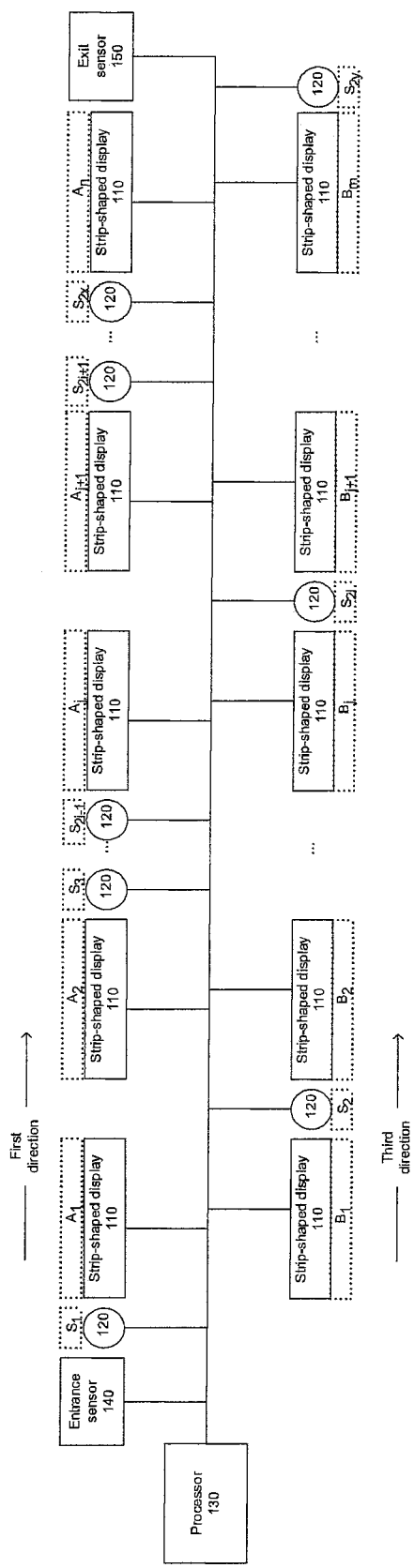
FIG. 5 is a schematic structural diagram of a further video playback apparatus according to an embodiment of the present disclosure.

FIG. 5 is a schematic structural diagram of a further video playback apparatus according to an embodiment of the present disclosure. On the basis of the embodiments of the present disclosure described above, the video playback apparatus according to the embodiment shown in FIG. 5 may further comprise an entrance sensor 140 disposed at an entrance in the first direction. In some embodiments, the entrance sensor 140 may be an infrared sensor.

In the embodiment of the present disclosure, the entrance sensor 140 is configured to detect whether there is a user entering a monitoring range of the video playback apparatus.

The processor 130 is further configured to turn on one or more image sensors 120 adjacent to the entrance sensor 140 when the entrance sensor 140 detects that there is a user entering the monitoring range of the video playback apparatus.

FIG. 5 is illustrated on the basis of the structure of the video playback apparatus shown in FIG. 4. Since the planes where the first direction and the third direction are located on both sides of the watching passage are oppositely arranged, the entrance sensor 140 may generate the same detection result for a user entering in the third direction. When the entrance sensor 140 detects that there is a user entering the monitoring range of the video playback apparatus, since the user moves from the entrance into the watching passage, the processor 130 may firstly turn on one or more image sensors 120 adjacent to the entrance sensor 140, i.e., turning on one or more image sensors 120 close to the entrance, for example, an image sensor $S_1$ in the first direction and an image sensor $S_2$ in the third direction. Further, in some embodiments, an entrance image sensor may be provided between the entrance sensor 140 and the first strip-shaped display 110 closest to the entrance sensor 140.

In some embodiments, the video playback apparatus may further comprise an exit sensor 150 disposed at an exit of the watching passage. The exit sensor 150 may detect that the user leaves the monitoring range of the video playback apparatus. Further, the processor 130 may determine whether there is still a user in the video playback apparatus according to the number of users entering the monitoring range detected by the entrance sensor 140, the number of users leaving the monitoring range detected by the exit sensor 150, and capturing results of the image sensors 120 in the apparatus; and if there is no user, turn off all of the strip-shaped displays 110, the image sensors 120, and the exit sensor 150 in the video playback apparatus while leaving the entrance sensor 140 always maintained in a turn-on state to detect a user entering the watching passage in real time. In some embodiments, the exit sensor 150 may be an infrared sensor. Further, in some embodiments, an exit image sensor may be provided between the exit sensor 150 and the first strip-shaped display 110 closest to the exit sensor 150.

In the embodiment of the present disclosure described above, it has been described that the processor 130 may control turn-on and turn-off of the image sensors 120, and when the processor 120 instructs a certain image sensor which is currently in a turn-on state to be turned off, the image sensor 120 may further detect whether there is a user in a captured picture thereof before it is turned off, and when it is detected that there is no user, perform a turn-off operation, and when it is detected that there is a user, remain in a turn-on state.

In the embodiment of the present disclosure, the processor 130 determines whether to turn on or turn off some other image sensors 120 in the application scenario according to a captured picture of a certain image sensor 120 which is turned on. However, a state of a user in the application scenario changes in real time, and there may continuously be a new user who enters the watching passage and is located in a capturing range of an image sensor 120 which is previously determined by the processor 130 to be turned off. Therefore, before each image sensor 120 which is in a turn-on state is turned off, it may further be determined whether the image sensor 120 satisfies a turn-off condition, and if there is a new user entering a captured picture of the image sensor 120, the image sensor 120 does not satisfy the turn-off condition.

Figure 6A:
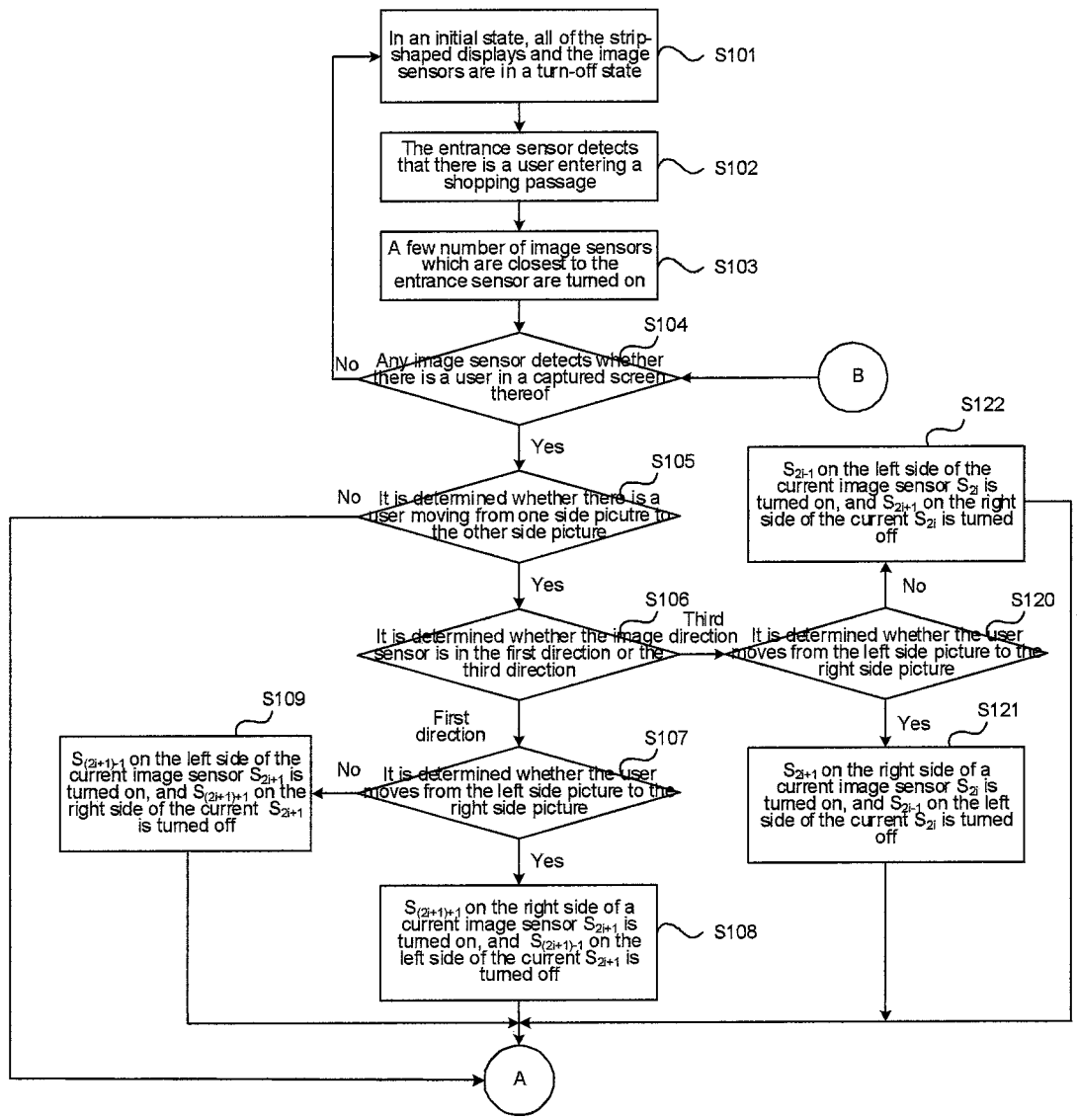
FIGS. 6A and 6B are flowcharts of a video playback process performed by a video playback apparatus according to an embodiment of the present disclosure.
Figure 6B:
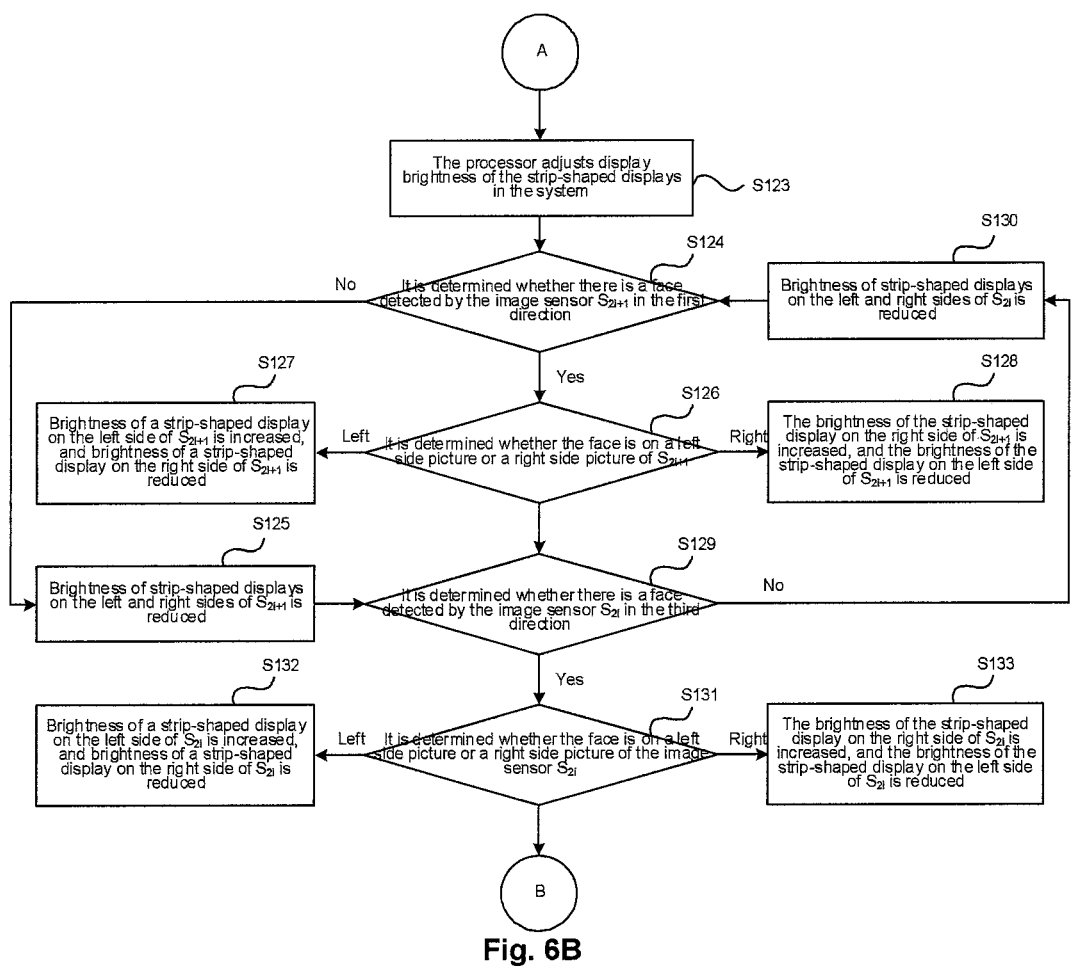

A processing manner of the video playback apparatus according to the embodiment of the present disclosure will be described in detail below by way of example. In this example, the application scenario of the video playback apparatus is, for example, shopping shelves in a supermarket, which are generally two rows of shopping shelves on opposite sides of a shopping passage in the supermarket (i.e., shopping shelves in planes where the first direction and the third direction are located), wherein each row of shopping shelves may be composed of a number of small shelves, and the strip-shaped displays 110 according to the embodiments of the present disclosure may be mounted on the small shelves. In addition, in the video playback apparatus according to the embodiment of the present disclosure, positions where the strip-shaped displays 110 and the image sensors 120 are disposed and a manner in which the strip-shaped displays 110 and the image sensors 120 are numbered may be known with reference to the video playback apparatus shown in FIG. 5, and will not be repeated here. As shown in FIGS. 6A and 6B, illustrated are flowcharts of a video playback process performed by a video playback apparatus according to an embodiment of the present disclosure. The flowcharts of the video playback process performed by the video playback apparatus according to the embodiment of the present disclosure may comprise the following steps.

In S101, in an initial state, all of the strip-shaped displays and the image sensors are in a turn-off state.

In S102, the entrance sensor detects that there is a user entering a shopping passage.

In S103, a small number of image sensors which are closest to the entrance sensor, for example, image sensors $S_1$ and $S_2$, are turned on.

In S104, each of the image sensors which are turned on detects whether there is a user in a captured picture thereof in real time; and when all the image sensors detect that there is no user, the procedure returns back to perform S101, and when at least one of the image sensors detects that there is a user in a captured picture thereof, S105 is performed.

In S105, the image sensor determines whether there is a user moving from one side picture to the other side picture in the captured picture thereof; and in a case where a determination result is no, S123 of FIG. 6B is performed, and if the determination result is yes, S106 is performed.

In S106, it is determined whether the image sensor is in the first direction or the third direction; and when it is determined that the image sensor is in the first direction, S107 is performed, and when it is determined that the image sensor is in the third direction, S120 is performed.

In S107, it is determined whether the user moves from the left side picture to the right side picture; and in a case where a determination result is yes, that is, the user moves from the left side picture to the right side picture of the image sensor, S108 is performed, and in a case where the determination result is no, that is, the user moves from the right side picture to the left side picture of the image sensor, S109 is performed.

In S108, an even-numbered image sensor $S_{(2i+1)+1}$ on the right side of a current odd-numbered image sensor $S_{2i+1}$ is turned on, and an even-numbered image sensor $S_{(2i+1)-1}$ on the left side of the current odd-numbered image sensor $S_{2i+1}$ is turned off; and then S123 of FIG. 6B is performed.

In S109, the even-numbered image sensor $S_{(2i+1)-1}$ on the left side of the current odd-numbered image sensor $S_{2i+1}$ is turned on, and the even-numbered image sensor $S_{(2i+1)+1}$ on the right side of the current odd-numbered image sensor $S_{2i+1}$ is turned off; and then S123 of FIG. 6B is performed.

In S120, it is determined whether the user moves from the left side picture to the right side picture; and in a case where a determination result is yes, that is, the user moves from the left side picture to the right side picture of the image sensor, S121 is performed, and in a case where the determination result is no, that is, the user moves from the right side picture to the left side picture of the image sensor, S122 is performed.

In S121, the odd-numbered image sensor $S_{2i+1}$ on the right side of a current even-numbered image sensor $S_{2i}$ is turned on, and an odd-numbered image sensor $S_{2i-1}$ on the left side of the current even-numbered image sensor $S_{2i}$ is turned off; and then S123 of FIG. 6B is performed.

In S122, the odd-numbered image sensor $S_{2i-1}$ on the left side of the current even-numbered image sensor $S_{2i}$ is turned on, and the odd-numbered image sensor $S_{2i+1}$ on the right side of the current even-numbered image sensor $S_{2i}$ is turned off; and then S123 of FIG. 6B is performed.

Subsequently, after the image sensors are turned on and turned off completely, the procedure proceeds to a process of determining states of the strip-shaped displays, that is, steps S123 and subsequent steps of FIG. 6B are performed.

In S123, the processor adjusts display brightness of the strip-shaped displays in the apparatus.

In S124, it is determined whether there is a face is in the image sensor $S_{2i+1}$ in the first direction; and in a case where a determination result is no, S125 is performed, and in a case where the determination result is yes, S126 is performed.

In S125, brightness of strip-shaped displays on the left and right sides of the image sensor $S_{2i+1}$ is reduced, and then S129 is performed.

In S126, it is determined whether the face is on a left side picture or a right side picture of the image sensor $S_{2i+1}$, and when it is determined that the face is on the left side picture, S127 is performed, and when it is determined that the face is on the right side picture, S128 is performed; and after the determination is performed, S129 continues to be performed.

In S127, brightness of a strip-shaped display on the left side of the image sensor $S_{2i+1}$ is increased, and brightness of a strip-shaped display on the right side of the image sensor $S_{2i+1}$ is reduced.

In S128, the brightness of the strip-shaped display on the right side of the image sensor $S_{2i+1}$ is increased, and the brightness of the strip-shaped display on the left side of the image sensor $S_{2i+1}$ is reduced.

In S129, it is determined whether there is a face in the image sensor $S_{2i}$ in the third direction, and in a case where a determination result is no, S130 is performed, and in a case where the determination result is yes, S131 is performed.

In S130, brightness of strip-shaped displays on the left and right sides of the image sensor $S_{2i}$ is reduced, and then the procedure returns back to perform S124.

In S131, it is determined whether the face is on a left side picture or a right side picture of the image sensor $S_{2i}$, and when it is determined that the face is on the left side picture, S132 is performed, and when it is determined that the face is on the right side picture, S133 is performed.

In step S132, brightness of a strip-shaped display on the left side of the image sensor $S_{2i}$ is increased, and brightness of a strip-shaped display on the right side of the image sensor $S_{2i}$ is reduced.

In step S133, the brightness of the strip-shaped display on the right side of the image sensor $S_{2i}$ is increased, and the brightness of the strip-shaped display on the left side of the image sensor $S_{2i}$ is reduced.

After the determination of S131 is performed, the procedure returns back to perform S104 of FIG. 6A.

It should be illustrated that, in the embodiment of the present disclosure, an order of determination of S124 and determination of S129 is not limited, that is, S124-S128 may be performed firstly, or S129-S133 may be performed firstly; and in a case where S129-S133 are performed firstly, the procedure may return back to perform S129 after S125 is performed, and the procedure may return back to perform S104 after S124 is performed.

Based on the video playback apparatus according to the embodiments of the present disclosure described above, the embodiments of the present disclosure further provide a video playback method, which is a method performed by the video playback apparatus according to any of the embodiments of the present disclosure described above.

Figure 7:
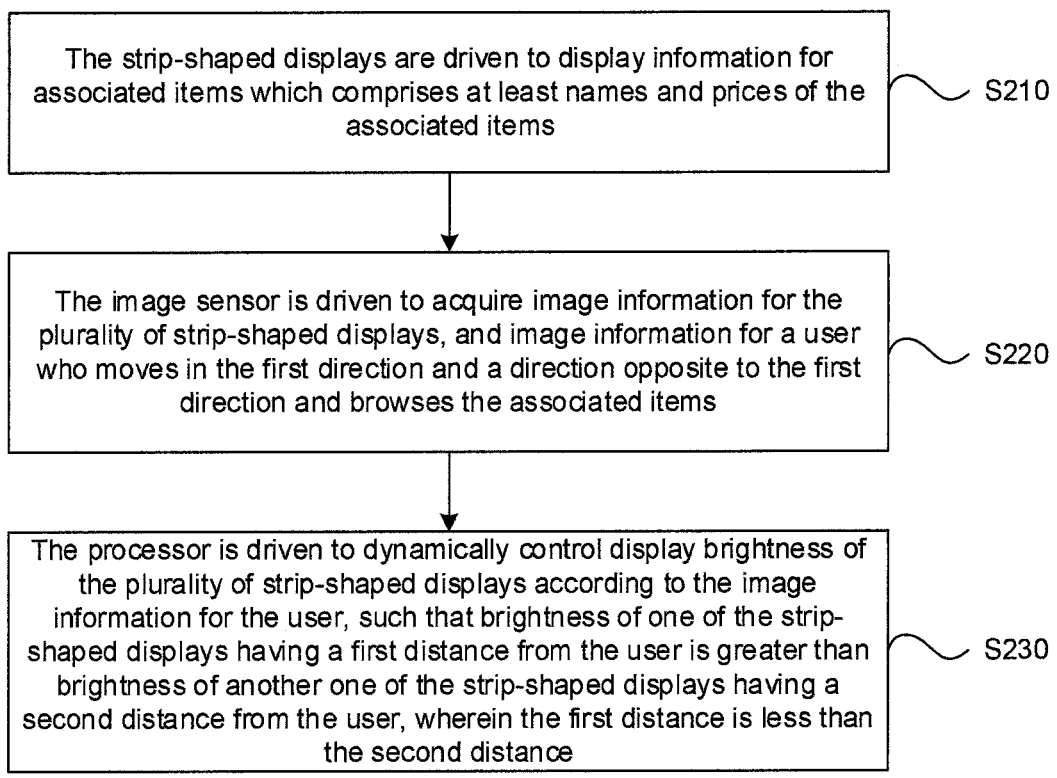
FIG. 7 is a flowchart of a video playback method according to an embodiment of the present disclosure.

As shown in FIG. 7, illustrated is a flowchart of a video playback method according to an embodiment of the present disclosure. The video playback method according to the present embodiment is implemented by the video playback apparatus according to the embodiments described above. A hardware structure of the video playback apparatus may be known with reference to the video playback apparatus according to any of the embodiments shown in FIGS. 1 to 5. The video playback method according to the embodiment of the present disclosure may comprise the following steps.

In S210, the strip-shaped displays are driven to display information for associated items which comprises at least names and prices of the associated items.

In S220, the image sensor is driven to acquire image information for the plurality of strip-shaped displays, and image information for a user who moves in the first direction and a direction opposite to the first direction and browses the associated items.

In S230, the processor is driven to dynamically control display brightness of the plurality of strip-shaped displays according to the image information for the user, so that brightness of one of the strip-shaped displays having a first distance from the user is greater than brightness of another one of the strip-shaped displays having a second distance from the user, wherein the first distance is less than the second distance.

The video playback method according to the embodiment of the present disclosure may be applied to a scenario where there is a passage through which a user may move and the plurality of strip-shaped displays and the image sensor may be disposed in the passage, for example, a shopping passage in a supermarket, a watching passage in a museum or other exhibition halls etc. The application scenarios of the video playback method and arrangement manners of the video playback apparatus for performing the method in the different scenarios have been described in detail in the embodiments described above, and thus will not be described in detail here.

The embodiment of the present disclosure may be known with reference to the hardware structures of the video playback apparatuses shown in FIG. 1 and FIG. 2, and the manners in which the strip-shaped displays and the image sensors in the video playback apparatuses are numbered. The embodiment of the present disclosure is described by taking the strip-shaped displays being disposed on shopping shelves in a supermarket as an example. The information for the associated items which is displayed by driving the strip-shaped displays may be information for items placed on the shopping shelves where the strip-shaped displays 110 are located, or may also be information for items placed on other shopping shelves. The information for the associated items may comprise not only names and prices of the associated items, but also specific positions where the associated items are located, for example, a zone where the shopping shelves are located, a floor and a region of the shopping shelves where the associated items are located, etc. All the strip-shaped displays in the apparatus are located in a capturing range of the image sensor. A user in the supermarket browses the associated items by watching the information for the associated items displayed by the strip-shaped displays, and thereby the image sensor may further capture image information for the user in front of the strip-shaped displays. The captured user may be a user who needs to purchase the associated items, and the user may move back and forth while watching, for example, the user may move in a direction (i.e., the first direction) in which the plurality of strip-shaped displays 110 are arranged, or may move in an opposite direction (i.e., a direction opposite to the first direction). Based on the arrangement of the image sensor, a type of information acquired by the image sensor and a manner in which the processor is disposed in the video playback apparatus, the processor may dynamically control display brightness of the plurality of strip-shaped displays according to the image information for the user acquired by the image sensor. For example, the processor may control the display brightness of the strip-shaped displays based on distances between the respective strip-shaped displays and the user, for example, a strip-shaped display close to the user has relatively high brightness, and a strip-shaped display away from the user has relatively low brightness. In a special case, when a distance between a certain strip-shaped display and the user exceeds a certain distance range, brightness of the strip-shaped display is adjusted so that the strip-shaped display enters a dark state, for example, a black screen state.

It should be illustrated that, in the embodiment of the present disclosure, the plurality of strip-shaped displays may display information for the same associated items, that is, the plurality of strip-shaped displays may be associated with the same items, or may display information for different associated items, that is, different strip-shaped displays may be associated with different items.

The video playback apparatus schematically shown in FIG. 1 above comprises one image sensor, and the video playback apparatus schematically shown in FIG. 2 comprises a plurality of image sensors arranged in the second direction parallel to the first direction. Each of the image sensors in the apparatus shown in FIG. 2 may capture primarily image information for strip-shaped displays in a capturing range of the current image sensor and image information for a user, and may obtain a moving direction and a watching direction of the user through the captured image information for the user. Further, a processor connected to each of the image sensors and each of the strip-shaped display may acquire the moving direction and the watching direction of the user which is captured by each of the image sensors, and after obtaining the information, may determine distances between the respective strip-shaped displays in the apparatus and the user, so as to dynamically adjust display brightness of the plurality of strip-shaped displays in the apparatus according to the distances. In another implementation of the embodiment of the present disclosure, if the strip-shaped displays are disposed on the shopping shelves on both sides of the shopping passage in the supermarket, the processor may further determine a specific side on which the user is currently watching strip-shaped displays through the watching direction of the user. For example, if the user moves from a position of $A_1$ to a position of $A_2$ in FIG. 2, and the watching direction of the user is a direction facing $A_2$, the processor may increase brightness of $A_2$ and reduce brightness of $A_1$, and dynamically adjust brightness of other strip-shaped displays in the video playback apparatus as the moving direction and the watching direction of the user.

It should be illustrated that, specific positions where the plurality of image sensors in the video playback apparatus for performing the video playback method are disposed are not limited in the embodiment of the present disclosure. The plurality of image sensors may be disposed on the top of a passage where a first strip-shaped area is located (i.e., in the second direction), as shown in FIG. 2. These image sensors may also be disposed in the first direction, for example, between the strip-shaped displays intermittently. Further, a specific number of strip-shaped displays disposed between two adjacent image sensors is not limited, and may be flexibly adjusted according to a capturing range of each of the image sensors. These image sensors may also be disposed at other positions parallel to the first direction, for example, on a side opposite to the shopping shelves where the strip-shaped displays are located, and may also capture the user moving in the first direction and in the opposite direction. In addition, capturing ranges of adjacent image sensors may abut each other, or may overlap with each other to some extent. The video playback apparatus shown in FIG. 2 is illustrated by taking an example in which a capturing range of each image sensor at least comprises an area covering a length of one strip-shaped display and capturing ranges of adjacent image sensors overlap with each other at edge positions in a certain area. The image sensors are disposed in such a way to eliminate a capturing dead angle and ensure the effectiveness of the capturing process.

The video playback method according to the embodiment of the present disclosure is based on the hardware facilities of the video playback apparatus according to the embodiments described above, in which the strip-shaped displays may display information for associated items, and the image sensors may acquire image information for the plurality of strip-shaped displays and image information for a user who moves in the first direction and a direction opposite to the first direction and browses the associated items. The processor may dynamically control display brightness of the plurality of strip-shaped displays according to the image information for the user acquired by the image sensors, so that, for example, brightness of a strip-shaped display close to the user is greater than that of a strip-shaped display away from the user. In the video playback method according to the embodiment of the present disclosure, the image sensors and the processor are configured in the video playback apparatus for performing the method so that the video playback apparatus may acquire the information related to the user in the application scenario thereof in real time, so as to dynamically control the display brightness of the strip-shaped displays in the video playback apparatus, to achieve the purpose of reducing the energy consumption. Further, when the brightness of the strip-shaped displays are dynamically controlled using the video playback method according to the embodiment of the present disclosure, an effect that strip-shaped displays with high brightness are being watched by users as much as possible and strip-shaped displays with low brightness or in a black screen state are not watched by users may be realized, so as to avoid the problem of a waste of resources.

It should be illustrated that, in the video playback method according to the embodiments of the present disclosure described above, users captured by different image sensors may not be the same user, that is, there may be more than one user in the application scenario. If there are a small number of users in the application scenario, it means that the application scenario is related to a large area, and the users are scattered at different positions in the scenario, that is, the small number of users may be located at different positions in the application scenario. At this time, the processor may dynamically control the brightness of the plurality of strip-shaped displays in the apparatus synthetically according to image information for the users captured by the plurality of image sensors. At this time, brightness of a small number of strip-shaped displays close to the users is greater than that of other strip-shaped displays away from the users.

In some embodiments, in the video playback apparatus for performing the video playback method, at least two of the plurality of strip-shaped displays are arranged contiguously, and the at least two strip-shaped displays which are arranged contiguously are spliced to display one image. The structure of the strip-shaped displays which are arranged contiguously may be known with reference to the embodiment shown in FIG. 3, and an implementation of realizing display through splicing has been described in detail in the above embodiments, and thus will not be described in detail here.

Figure 8:
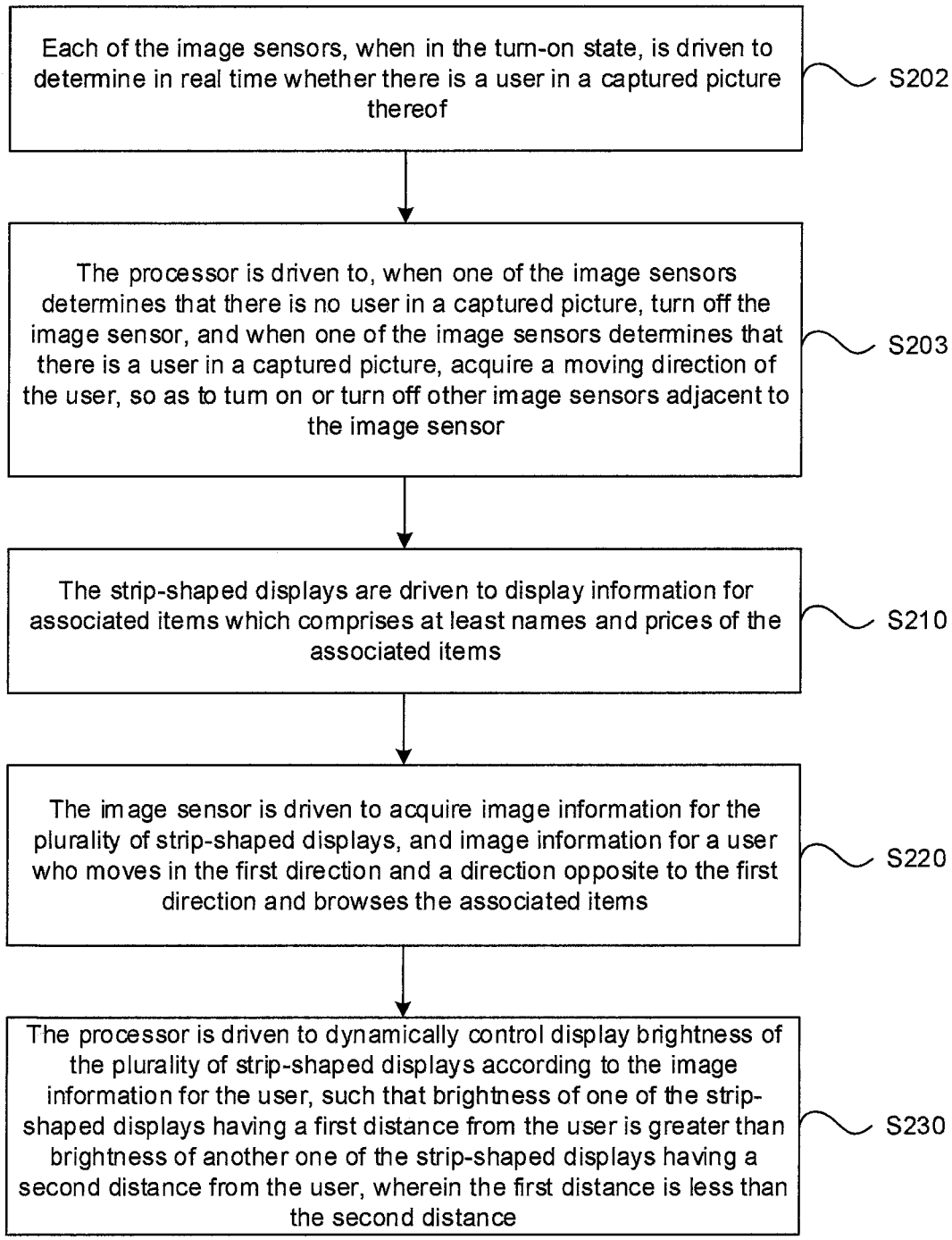
FIG. 8 is a flowchart of another video playback method according to an embodiment of the present disclosure.

FIG. 8 is a flowchart of another video playback method according to an embodiment of the present disclosure. In the embodiment of the present disclosure, the image information for the user acquired by the image sensors may comprise a moving direction of the user, and there may be a plurality of image sensors arranged in a second direction parallel to a first direction or arranged in the first direction. It may be seen from an operating manner of the video playback apparatus according to the embodiments of the present disclosure described above that, the image sensor according to the embodiment of the present disclosure may have a turn-on state and a turn-off state. Generally, an image sensor with a user in a capturing range thereof is in a turn-on state, and an image sensor without a user in a capturing range thereof is in a turn-off state. On the basis of the flowchart shown in FIG. 7, the video playback method according to the embodiment of the present disclosure may further comprise the following steps.

In S202, each of the image sensors, when in the turn-on state, is driven to determine whether there is a user in a captured picture thereof in real time.

In S203, the processor is driven to, when one of the image sensors determines that there is no user in a captured picture, turn off the image sensor, and when one of the image sensors determines that there is a user in a captured picture, acquire a moving direction of the user, so as to turn on or turn off other image sensors adjacent to the image sensor.

In the embodiment of the present disclosure, the processor in the video playback apparatus for performing the video playback method may not only dynamically control the display brightness of the strip-shaped displays, but also may control turn-on and turn-off of the image sensors. Further, the turn-on and turn-off of the image sensors are related to the moving direction of the user, for example, after the user moves, if an image sensor is gradually close to the user, the image sensor is to be turned on, and after the user moves, if an image sensor is gradually away from the user, the image sensor is to be turned off. In the embodiment of the present disclosure, the turn-on and turn-off of the image sensors are controlled by the processor, which may further reduce the energy consumption when the video playback method is performed, and when there is a small number of users in an application scenario thereof, the image sensors are selected to turn on image sensors each with a user in a capturing range thereof, so that the image sensors which are turned on may achieve an effective capturing process, which not only enhances the effective use rate of each hardware device in the video playback apparatus, but also further reduces a waste of resources in the apparatus.

It should be illustrated that the image sensors in the turn-on state described in the embodiment of the present disclosure do not exclude an image sensor $S_{i-1}$ which has not been turned off when a user just moves from a capturing range of the image sensor $S_{i-1}$ to a capturing range of another image sensor $S_i$. It takes some processing time for the processor to turn off a certain image sensor according to a captured picture of the image sensor and a determination result.

In some embodiments, the image information for the user acquired by the image sensors may further comprise a watching direction of the user, and an image sensor which performs a capturing process is generally an image sensor with a user in a captured picture.

In the embodiment of the present disclosure, the processor may dynamically control the display brightness of the plurality of strip-shaped displays 110 by:

increasing brightness of a strip-shaped display which is adjacent to an image sensor with a user in a captured picture thereof and is currently being watched by the user according to a position of the image sensor and a watching direction of the user acquired by the image sensor.

In the embodiment of the present disclosure, when the processor dynamically controls the display brightness of the strip-shaped displays, it may perform reasonable controlling not only according to a position and the moving direction of the user in the application scenario, but also in combination with the watching direction of the user. For example, the user moves in the first direction and a direction opposite to the first direction, but the watching direction of the user is not toward the strip-shaped displays on the shopping shelves in the first direction, and instead, is another direction, for example, a direction toward shopping shelves opposite to the shopping shelves in the first direction, that is, the strip-shaped displays which are passed by the user at this time are not watched by the user even if they are turned on. Therefore, when it is determined that the user is in a capturing range of an image sensor which is currently performing a capturing process and is watching a certain strip-shaped display adjacent to the image sensor according to the watching direction of the user, brightness of the strip-shaped display which is currently in an effective watching state is increased, thereby further improving the effective use rate of each hardware device in the video playback apparatus, and further reducing the waste of resources in the apparatus.

In some embodiments, image information for a user acquired by image sensors may also comprise a watching direction of the user. The video playback apparatus according to the embodiment of the present disclosure may further comprise: a plurality of strip-shaped displays arranged in a third direction parallel to the first direction, and the image sensors are disposed between the strip-shaped displays in the first direction and between the strip-shaped displays in the third direction intermittently. The video playback apparatus for performing the video playback method according to the embodiment of the present disclosure may be known with reference to FIG. 4, and in the video playback method performed by the apparatus, each of the image sensors, when in a turn-on state, is driven to acquire the image information for the user by:

driving each of the image sensors, when in a turn-on state, to detect the face of the user when the user is captured in real time.

Correspondingly, the processor is driven to dynamically control the display brightness of the strip-shaped displays by:

driving the processor to acquire a watching direction of the user when one of image sensors in the first direction detects the face or one of image sensors in the third direction captures the user but does not detect the face, so as to increase brightness of the strip-shaped displays in the first direction; or acquire the watching direction of the user when one of the image sensors in the third direction detects the face or one of the image sensors in the first direction captures the user but does not detect the face, so as to increase brightness of the strip-shaped displays in the third direction.

In an application scenario of the embodiment of the present disclosure, the watching passage is no longer a video passage which may only be used for watching on a single side, and there are strip-shaped displays disposed on both sides of the watching passage (i.e., on planes where the first direction and the third direction are located). The planes where the first direction and the third direction are located may be walls on both sides of the watching passage or shopping shelves on both sides of a shopping passage in a supermarket. In addition, the video playback method according to the embodiment of the present disclosure is illustrated by taking the image sensors being disposed on the planes where the first direction and the third direction are located as an example. Since there are strip-shaped displays arranged in the first direction and the third direction, the image sensors may be disposed between the strip-shaped displays intermittently. As may be seen from FIG. 4, FIG. 4 is illustrated by taking two strip-shaped displays being disposed between two adjacent image sensors as an example. Since the image sensors and the strip-shaped displays are disposed on the same plane in the embodiment of the present disclosure, the face of the user generally faces a strip-shaped display which is in a visual range of the user and is convenient for watching during the movement of the user. For one user, since the planes where the first direction and the third direction are located are on opposite sides and the user may only watch strip-shaped displays on only one side at a time, the processor may acquire a watching direction of the user according to whether one of the image sensors detects the face of the user, and dynamically control brightness of the strip-shaped displays in the first direction or the third direction according to the watching direction.

It should be illustrated that a specific density at which the image sensors are disposed is not limited in the embodiment of the present disclosure, that is, a number of strip-shaped displays disposed between two adjacent image sensors is not limited, and may be reasonably set according to capturing ranges of the two adjacent image sensors.

In some embodiments, a captured picture of each of the image sensors comprises a left side picture and a right side picture, the image sensors in the first direction are numbered with odd numbers sequentially from left to right, the image sensors in the third direction are numbered with even numbers sequentially from left to right, an image sensor $S_{2i}$ is located adjacent to the left side of an image sensor $S_{2i+1}$, and the image sensor $S_{2i}$ is located adjacent to the right side of an image sensor $S_{2i-1}$, where i is a positive integer greater than or equal to 1, which may be known with reference to arrangement manners of the strip-shaped displays and the image sensors in the video playback apparatus and a manner in which the strip-shaped displays and the image sensors are numbered as shown in FIG. 4, and the video playback method according to the embodiment of the present disclosure may further comprise the following steps.

In step 1, each of the image sensors, when in a turn-on state, is driven to determine whether there is a user moving from one side picture to the other side picture in a captured picture;

In step 2, the processor is driven to, when a determination result of one of the image sensors is yes, determine whether the image sensor is located in the first direction or the third direction;

In step 31, an image sensor $S_{(2i+1)+1}$ on the right side of a current image sensor $S_{2i+1}$ is turned on and an image sensor $S_{(2i+1)-1}$ on the left side of the current image sensor $S_{2i+1}$ is turned off when the image sensor is located in the first direction and the user moves from the left side picture to the right side picture;

In step 32, the image sensor $S_{(2i+1)-1}$ on the left side of the current image sensor $S_{2i+1}$ is turned on and the image sensor $S_{(2i+1)+1}$ on the right side of the current image sensor $S_{2i+1}$ is turned off when the image sensor is located in the first direction and the user moves from the right side picture to the left side picture;

In step 33, the image sensor $S_{2i+1}$ on the right side of a current image sensor $S_{2i}$ is turned on and an image sensor $S_{2i-1}$ on the left side of the current image sensor $S_{2i}$ is turned off when the image sensor is located in the third direction and the user moves from the left side picture to the right side picture; and In step 34, the image sensor $S_{2i-1}$ on the left side of the current image sensor $S_{2i}$ is turned on and the image sensor $S_{2i+1}$ on the right side of the current image sensor $S_{2i}$ is turned off when the image sensor is located in the third direction and the user moves from the right side picture to the left side picture.

In step 4, each of the image sensors which are in a turn-on state is driven to detect whether there is a user in a captured picture thereof before it is turned off, and when it is detected that there is no user, perform a turn-off operation, and when it is detected that there is a user, remain in a turn-on state.

In the embodiment of the present disclosure, the processor determines whether to turn on turn off some other image sensors in the application scenario according to a captured picture of a certain image sensor which is turned on. However, a state of a user in the application scenario changes in real time, and there may continuously be a new user who enters the watching passage and is located in a capturing range of an image sensor which is previously determined to be turned off. Therefore, before each image sensor which is in a turn-on state is turned off, it may further be determined whether the image sensor satisfies a turn-off condition, and if there is a new user entering the captured picture of the image sensor, the image sensor does not satisfy the turn-off condition.

In step 5, the processor is driven to adjust display brightness of the strip-shaped displays in the video playback apparatus in a case where a determination result of one of the image sensors is no and/or after one of the image sensors is turned on each time.

In the embodiment of the present disclosure, after the processor newly turns on one image sensor each time, or in a case where a determination result of the image sensor is no, that is, in a case where there is no user moving from one side picture to the other side picture of the captured picture, the processor may further adjust the display brightness of the strip-shaped displays in the video playback apparatus. A basic principle of the dynamic control by the processor may be based on the moving direction and the watching direction of the user, and an implementation of the processor dynamically controlling the brightness of the strip-shaped displays will be described in a practical application scenario in the following embodiments.

In the embodiment of the present disclosure, in order to better determine the moving direction of the user, the captured picture of each of the image sensors may be divided into two parts, i.e., a left side picture and a right side picture, and in a case where there is only one user in a captured picture of a certain image sensor, a moving direction of the user in a watching passage may be determined according to a moving direction of the user in the captured picture, and turn-on and turn-off of the image sensors in the apparatus are controlled according to the moving direction of the user, i.e., dynamically turning on the image sensor which may capture the user, and turning off the image sensor when the user leaves a capturing range of the image sensor which is originally turned on since the user moves. In addition, if the image sensor captures the user and the user does not move in the captured picture, it may be determined that the user in the captured picture is watching a certain strip-shaped video at a fixed point. At this time, the processor may control to increase brightness of the strip-shaped display which is currently being watched by the user, and reduce brightness of strip-shaped displays in an inactive watching state. Further, each time the processor turns on an image sensor, it means that the user in the watching passage has moved. At this time, the display brightness of the strip-shaped displays in the video playback apparatus may be adjusted again according to a captured picture of the image sensor which is newly turned on.

In some embodiments, in a process of the processor adjusting the display brightness of the strip-shaped displays in the video playback apparatus, the processor may make the adjustment based on the watching direction of the user captured by the image sensors. The watching direction of the user may further be determined by performing the following steps after the face of the user is detected.

Each of the image sensors, when in a turn-on state, is driven to determine whether the face is on a left side picture or a right side picture of a captured picture.

In the embodiment described above, the processor is driven to adjust display brightness of the strip-shaped displays in the video playback apparatus by:

when one of the image sensors determines that the face is on the left side picture of the captured picture, increasing brightness of a strip-shaped display on the left side of the image sensor and reducing brightness of a strip-shaped display on the right side of the image sensor; and when one of the image sensors determines that the face is on the right side of the captured picture, increasing the brightness of the strip-shaped display on the right side of the image sensor and reducing the brightness of the strip-shaped display on the left side of the image sensor.

In the embodiment of the present disclosure, based on a manner in which the image sensors and the strip-shaped displays are disposed on the same plane, in a case where one of the image sensors has detected the face of the user, it may further be determined which side of the image sensor a strip-shaped display watched by the user is located on, and brightness of the strip-shaped display which is currently being watched by the user may be adjusted accurately.

It should be illustrated that in the embodiment of the present disclosure, whether the image sensor, which captures the face of the user and determines which side of the captured picture the face is located, is located in the first direction or the third direction is not limited. Regardless of the direction where the image sensor is located, the processor adjusts brightness of a strip-shaped display at a position corresponding to the image sensor according to a position of the face in the captured picture in the same manner with reference to the same direction. For example, when an image sensor $S_{2i+1}$ in the first direction captures a face and the face is located on a left side picture of a captured picture, brightness of a strip-shaped display on the left side of the image sensor $S_{2i+1}$ is increased, and brightness of a strip-shaped display on the right side of the image sensor $S_{2i+1}$ is reduced. As another example, when an image sensor $S_{2i}$ in the third direction captures a face and the face is located on a right side picture of a captured picture, brightness of a strip-shaped display on the right side of the image sensor $S_{2i}$ is increased, and brightness of a strip-shaped display on the left side of the image sensor $S_{2i}$ is reduced.

Figure 9:
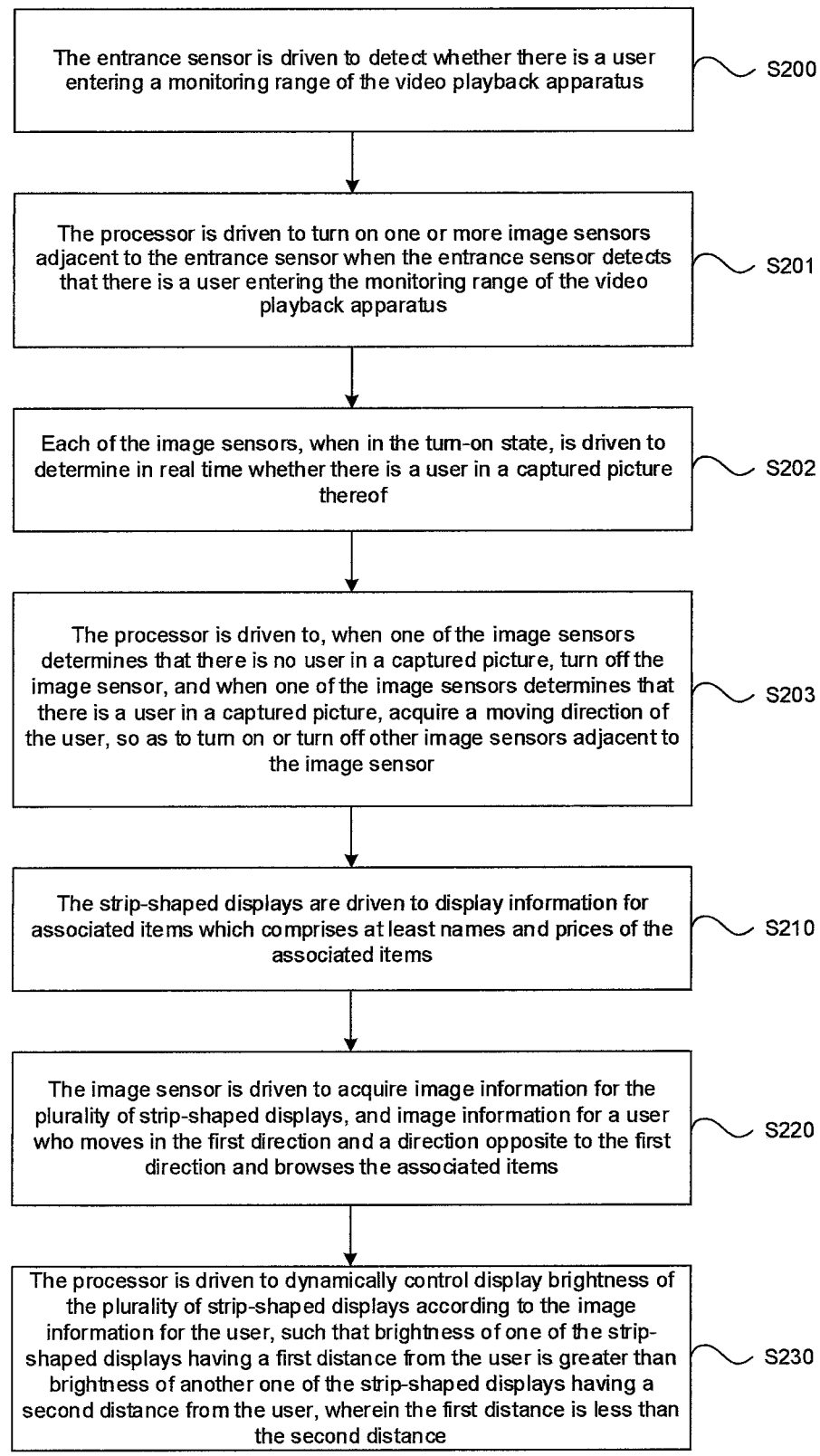
FIG. 9 is a flowchart of yet another video playback method according to an embodiment of the present disclosure.

FIG. 9 is a flowchart of yet another video playback method according to an embodiment of the present disclosure. The video playback apparatus for performing the video playback method according to the embodiment of the present disclosure further comprises an entrance sensor disposed at an entrance in the first direction, and FIG. 9 is illustrated by taking the flowchart shown in FIG. 8 as an example. The video playback method may further comprise the following steps.

In S200, the entrance sensor is driven to detect whether there is a user entering a monitoring range of the video playback apparatus.

In S201, the processor is driven to turn on one or more image sensors adjacent to the entrance sensor when the entrance sensor detects that there is a user entering the monitoring range of the video playback apparatus.

The video playback apparatus for performing the video playback method according to the embodiment of the present disclosure may be seen in FIG. 5. Since the planes where the first direction and the third direction are located on both sides of the watching passage are oppositely arranged, the entrance sensor may generate the same detection result for a user entering in the third direction. When the entrance sensor detects that there is a user entering the monitoring range of the video playback apparatus, since the user moves from the entrance into the watching passage, the processor may firstly turn on one or more image sensors adjacent to the entrance sensor, i.e., turning on one or more image sensors close to the entrance, for example, an image sensor $S_1$ in the first direction and an image sensor $S_2$ in the third direction.

In some embodiments, the video playback apparatus for performing the video playback method may further comprise an exit sensor disposed at an exit of the watching passage. The video playback method may further comprise the following steps.

In S230, the exit sensor is driven to detect that the user leaves the monitoring range of the video playback apparatus.

In S240, the processor is driven to determine whether there is still a user in the video playback apparatus according to the number of users entering the monitoring range detected by the entrance sensor, the number of users leaving the monitoring range detected by the exit sensor, and capturing results of the image sensors in the video playback apparatus; and if there is no user, turn off all of the strip-shaped displays, the image sensors, and the exit sensor in the video playback apparatus while leaving the entrance sensor always maintained in a turn-on state to detect a user entering the monitoring range in real time.

The embodiments of the present disclosure further provide a computer readable storage medium, having stored thereon executable instructions, which when executed by a processor, may implement the video playback method according to any of the embodiments of the present disclosure described above. The video playback method is a method of dynamically controlling a plurality of strip-shaped displays and image sensors in a video playback apparatus. An implementation of the computer readable storage medium according to the embodiment of the present disclosure is substantially the same as that of the video playback method according to the embodiments of the present disclosure described above, and will not be described in detail here.

It may be understood by those of ordinary skill in the art that all or some of the steps in the methods disclosed above, systems, and functional blocks/units in the apparatuses disclosed above may be implemented as software, firmware, hardware, and suitable combinations thereof. In a hardware implementation, division of functional modules/units mentioned in the above description does not necessarily correspond to division of physical components; for example, one physical component may have multiple functions, or one function or step may be performed cooperatively by several physical components. Some or all of the components may be implemented as software executed by a processor, such as a digital signal processor or a microprocessor, or may be implemented as hardware, or may be implemented as an integrated circuit, such as an application specific integrated circuit. Such software may be distributed on a computer readable medium, which may comprise a computer storage medium (or a non-transitory medium) and a communication medium (or a transitory medium). It is well known to those skilled in the art the term computer storage medium comprises volatile and nonvolatile media or removable and non-removable media implemented in any method or technology for storing information (for example, computer readable instructions, data structures, program modules or other data). The computer storage medium comprises, but not limited to, a Random Access Memory (RAM), a Random Only Memory (ROM), an Electrically Erasable Programmable Read Only Memory (EEPROM), a flash memory or other memory technology, a Compact Disc (CD)-ROM, a Digital Versatile Disc (DVD) or other optical disc storage, magnetic cartridge, magnetic tape, magnetic disk storage or other magnetic storage apparatus, or may be any other medium which is used to store desired information and may be accessed by the computer. Further, it is well known to those skilled in the art that the communication medium typically comprises computer readable instructions, data structures, program modules, or other data in a modulated data signal, such as a carrier wave or other transport mechanism, and may comprise any information delivery media.

Although the implementations have been disclosed above in the present disclosure, the content described is merely implementations used to facilitate the understanding of the present disclosure, and are not intended to limit the present disclosure. Any modification or variation in the form and details of the implementations may be made by those skilled in the art without departing from the spirit and scope of the present disclosure, but the patent protection scope of the present disclosure should be defined by the scope of the appended claims.

We claim:

1. A video playback apparatus, comprising:
an image sensor,
a plurality of strip-shaped displays arranged in a first direction, and
a processor connected to each of the strip-shaped displays and the image sensor, respectively,
wherein the strip-shaped displays are configured to display information for associated items, the information comprising at least names and prices of the associated items;
wherein the image sensor is configured to acquire image information for the plurality of strip-shaped displays, and to acquire image information for a user who is watching one or more of the strip-shaped displays; and
wherein the processor is configured to dynamically control display brightness of the plurality of strip-shaped displays according to the image information for the user,
wherein there are a plurality of image sensors arranged in a second direction parallel to the first direction,
wherein each of the plurality on image sensors is arranged between its adjacent strip-shaped displays,
wherein the image information for the user comprises a moving direction of the user,
wherein each of the image sensors is further configured to determine whether there is a user in a captured picture; and
wherein the processor is further configured to, when one of the image sensors determines that there us no user in a captured picture, turn off the image sensor, and when one of the image sensors determine that there is a user in a captured picture, acquire the moving direction of the user, so as to sequentially turn on the image sensors arranged in the second direction when the moving direction of the user is same as the first direction.

2. The video playback apparatus according to claim 1, wherein the image information for the user comprises a watching direction of the user;
wherein each of the image sensors is further configured to detect the face of a user when the image information for the user is captured in real time; and
wherein the processor is further configured to acquire the watching direction of the user when one of the image sensors detects the face, so as to increase brightness of the strip-shaped displays corresponding to the watching direction of the user.

3. The video playback apparatus according to claim 1, wherein the plurality of strip-shaped displays comprise a first row of strip-shaped displays in the first direction and a second row of strip-shaped displays in the third direction parallel to the first direction, and the first row of strip-shaped displays comprising a plurality of first strip-shaped displays are arranged opposite to the second row of strip-shaped displays comprising a plurality of second strip-shaped displays,
wherein the plurality of image sensors comprise a first row of image sensors and a second row of image sensors, the first row of image sensors comprises a plurality of first image sensors, the second row of image sensors comprises a plurality of second image sensors, each of the first image sensors is located between adjacent, first strip-shaped displays, and each of the second image sensors is located between adjacent, second strip-shaped displays;
wherein the processor is further configured to turn on the first strip-shaped display close to one of the first image sensors when the face of the user is detected by the first image sensor, and turn on the second strip-shaped display close to one of the second image sensors when the face of the user is detected by the second image sensor.

4. The video playback apparatus according to claim 3, wherein
the processor is further configured to turn off the first strip-shaped display close to one of the first image sensors and/or turn off the first image sensor when the face of the user is not detected by the first image sensor, and turn off the second strip-shaped display close to one of the second image sensors and/or turn off the second image sensor when the face of the user is not detected by the second image sensor.

5. The video playback apparatus according to claim 3, wherein the plurality of first strip-shaped displays in the first row of strip-shaped displays correspond to the plurality of second strip-shaped displays in the second row of strip-shaped displays in a one-to-one manner, two of the first strip-shaped displays are provided between the adjacent first image sensors, two of the second strip-shaped displays are provided between the adjacent second image sensors, and the first image sensors provided between the first strip-shaped displays are provided alternately with respect to the second image sensors provided between the second strip-shaped displays.

6. The video playback apparatus according to claim 1, further comprising: an entrance sensor disposed at an entrance in the first direction, wherein
the entrance sensor is configured to detect whether there is a user entering a monitoring range of the video playback apparatus; and
the processor is further configured to turn on one or more of the image sensors adjacent to the entrance sensor when the entrance sensor detects that there is a user entering the monitoring range of the video playback apparatus.

7. The video playback apparatus according to claim 6, wherein the entrance sensor is an infrared sensor.

8. The video playback apparatus according to claim 6, wherein an entrance image sensor is provided between the entrance sensor and the first strip-shaped display closest to the entrance sensor.

9. The video playback apparatus according to claim 6, further comprising: an exit sensor disposed at an exit of a watching passage, wherein
the exit sensor is configured to detect whether the user leaves the monitoring range of the video playback apparatus; and
the processor is further configured to determine whether there is any user according to the number of users entering the monitoring range detected by the entrance sensor, the number of users leaving the monitoring range detected by the exit sensor, and capturing results of the image sensors, and if there is no user, turn off all of the strip-shaped displays, the image sensors, and the exit sensor.

10. The video playback apparatus according to claim 9, wherein an exit image sensor is provided between the exit sensor and the first strip-shaped display closestto the exit sensor.

11. The video playback apparatus according to claim 1, wherein each of the image sensors is further configured to detect whether there is a user in a captured picture thereof before the image sensor is turned off, and perform a turn-off operation when it is detected that there is no user, and remain in a turn-on state when it is detected that there is a user.

12. A video playback method performed by a video playback apparatus comprising an image sensor, a plurality of strip-shaped displays arranged in a first direction, and a processor connected to each of the strip-shaped displays and the image sensor, respectively, the method comprising:
driving the strip-shaped displays to display information for associated items which comprises at least names and prices of the associated items;
driving the image sensor to acquire image information for the plurality of strip-shaped displays, and image information for a user who is watching one or more of the strip-shaped displays; and
driving the processor to dynamically control display brightness of the plurality of strip-shaped displays according to the image information for the user,
wherein the image information for the user comprises a moving direction of the user, there are a plurality of image sensors arranged in a second direction parallel to the first direction, and the method further comprises;
driving each of the image sensors to determine whether there is a user in a captured picture; and
driving the processor to, when one of the image sensors determined that there is no user in a captured picture, tune off the image sensor, and when on of the image sensors determines that there is a user in a captured pictures, acquiring a moving direction the user, so as to sequentially turn on the image sensors arranged in the second direction when the moving direction of the user is same as the first direction.

13. The video playback method according to claim 12, wherein the image information for the user comprises a watching direction of the user, and the method further comprises:
driving each of the image sensors to detect the face of a user when the image information for the user is captured in real time; and
driving the processor to acquire the watching direction of the user when one of image sensors detects the face, so as to increase brightness of the strip-shaped displays corresponding to the watching direction of the user.

14. The video playback method according to claim 13, wherein the plurality of strip-shaped displays comprise a first row of strip-shaped displays in the first direction and a second row of strip-shaped displays in the third direction parallel to the first direction, and the first row of strip-shaped displays comprising a plurality of first strip-shaped displays are arranged opposite to the second row of strip-shaped displays comprising a plurality of second strip-shaped displays,
wherein the plurality of image sensors comprise a first row of image sensors and a second row of image sensors, the first row of image sensors comprises a plurality of first image sensors, the second row of image sensors comprises a plurality of second image sensors, each of the first image sensors is located between adjacent, first strip-shaped displays, and each of the second image sensors is located between adjacent, second strip-shaped displays;
wherein the method further comprises: driving the processor to turn on the first strip-shaped display close to one of the first image sensors when the face of the user is detected by the first image sensor, and turn on the second strip-shaped display close to one of the second image sensors when the face of the user is detected by the second image sensor.

15. The video playback method according to claim 14, wherein the method further comprises:

driving the processor to turn off the first strip-shaped display close to one of the first image sensors and/or turn off the first image sensor when the face of the user is not detected by the first image sensor, and turn off the second strip-shaped display close to one of the second image sensors and/or turn off the second image sensor when the face of the user is not detected by the second image sensor.

16. The video playback method according to claim 14, wherein the plurality of first strip-shaped displays in the first row of strip-shaped displays correspond to the plurality of second strip-shaped displays in the first row of strip-shaped displays in a one-to-one manner, two of the first strip-shaped displays are provided between the adjacent first image sensors, two of the second strip-shaped displays are provided between the adjacent second image sensors, and the first image sensors provided between the first strip-shaped displays are provided alternately with respect to the second image sensors provided between the second strip-shaped displays.

* * * * *